(12) United States Patent
Jiang et al.

(10) Patent No.: US 7,662,892 B2
(45) Date of Patent: Feb. 16, 2010

(54) IMPACT COPOLYMERS

(75) Inventors: Peijun Jiang, League City, TX (US);
John Richard Shutt, Merchtem (BE);
Charles Stanley Speed, Dayton, TX (US); Pradeep P. Shirodkar, Stow, OH (US); Robert Olds Hagerty, La Porte, TX (US); Larry L. Iaccino, Seabrook, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 502 days.

(21) Appl. No.: 11/628,183

(22) PCT Filed: Jun. 20, 2005

(86) PCT No.: PCT/US2005/021648

§ 371 (c)(1),
(2), (4) Date: Nov. 30, 2006

(87) PCT Pub. No.: WO2006/009945

PCT Pub. Date: Jan. 26, 2006

(65) Prior Publication Data

US 2007/0225455 A1    Sep. 27, 2007

Related U.S. Application Data

(60) Provisional application No. 60/581,598, filed on Jun. 21, 2004.

(51) Int. Cl.
*C08F 2/14* (2006.01)
*C08F 255/02* (2006.01)

(52) U.S. Cl. .............................. 526/65; 526/206; 525/53

(58) Field of Classification Search .................. 525/53; 526/65, 206
See application file for complete search history.

(56) References Cited

U.S. PATENT DOCUMENTS

| | | | |
|---|---|---|---|
| 2,474,571 A | 6/1949 | Brakeley et al. |
| 2,494,585 A | 1/1950 | Saylor et al. |
| 2,534,698 A | 12/1950 | Calfee et al. |
| 2,548,415 A | 4/1951 | Welch et al. |
| 2,603,626 A | 7/1952 | Kolfenbach et al. |
| 2,644,809 A | 7/1953 | Saylor et al. |
| 2,913,446 A | 11/1959 | Cull et al. |
| 2,952,669 A | 9/1960 | Bro et al. |
| 3,056,771 A | 10/1962 | Aldridge et al. |
| 3,269,972 A | 8/1966 | Banks et al. |
| 3,331,822 A | 7/1967 | Kometani et al. |
| 3,397,166 A | 8/1968 | Schmidle et al. |
| 3,440,219 A | 4/1969 | Wolff et al. |
| 3,470,143 A | 9/1969 | Schrage et al. |
| 3,493,530 A | 2/1970 | Sianesi et al. |
| 3,528,954 A | 9/1970 | Carlson et al. |
| 3,590,025 A | 6/1971 | Tittle |
| 3,616,371 A | 10/1971 | Ukihashi et al. |
| 3,642,742 A | 2/1972 | Carlson |
| 3,787,379 A | 1/1974 | Ferren et al. |
| 3,919,183 A | 11/1975 | Jager et al. |
| 3,996,281 A | 12/1976 | Huber-Emden et al. |
| 4,016,342 A | 4/1977 | Wagensommer |
| 4,042,634 A | 8/1977 | Cope et al. |
| 4,100,225 A | 7/1978 | Mueller |
| 4,123,602 A | 10/1978 | Ukihashi et al. |
| 4,166,165 A | 8/1979 | Hisasue et al. |
| 4,194,073 A | 3/1980 | McDaniel |
| 4,338,237 A | 7/1982 | Sulzbach et al. |
| 4,357,448 A | 11/1982 | Tsubaki et al. |
| 4,373,093 A | 2/1983 | Olson et al. |
| 4,381,387 A | 4/1983 | Sulzbach |
| 4,424,324 A | 1/1984 | Throckmorton et al. |
| 4,435,553 A | 3/1984 | Throckmorton et al. |
| 4,452,960 A | 6/1984 | Throckmorton |
| 4,499,249 A | 2/1985 | Nakagawa et al. |
| 4,508,881 A | 4/1985 | Throckmorton |
| 4,535,136 A | 8/1985 | Wheland |
| 4,588,790 A | 5/1986 | Jenkins, III et al. |
| 4,588,796 A | 5/1986 | Wheland |
| 4,626,608 A | 12/1986 | Scherer, Jr. et al. |
| 4,736,004 A | 4/1988 | Scherer, Jr. et al. |
| 4,900,777 A | 2/1990 | Ball et al. |
| 4,946,936 A | 8/1990 | Moggi et al. |

(Continued)

FOREIGN PATENT DOCUMENTS

EP    0 089 691    9/1983

(Continued)

OTHER PUBLICATIONS

U.S. Appl. No. 11/285,264, filed Nov. 22, 2005, Iaccino et al.
"A Low-Energy Solvent Separation Method," T. G. Gutowski et al., Polymer Engineering; "Solvents" by C. A. Irani et al., Journal of Applied Polymer Science vol. 31, 1879-1899 (1986).
"Separating Polymer Solutions with Supercritical Fluids," Mark A. McHugh et al., Macromolecules 1985, 18, 674-680.
"Critical dynamics and phase-separation kinetics in dynamically asymmetric binary fluids: New dynamic universality class for polymer mixtures or dynamic crossover?," Hajime Tanaka, Journal of Chemical Physics 100 (7), Apr. 1, 1994, 5323-5337.

(Continued)

*Primary Examiner*—Fred M Teskin
(74) *Attorney, Agent, or Firm*—Catherine L. Bell

(57) ABSTRACT

This invention relates to a continuous process to prepare olefin impact copolymers comprising producing a semi-crystalline olefin polymer in a first reactor and then transferring the reactor contents to a second reactor where a low crystallinity olefin polymer is produced in the presence of the semi-crystalline polymer, where a fluorinated hydrocarbon is present in the polymerization medium of the first reactor, the second reactor or both reactors.

44 Claims, No Drawings

U.S. PATENT DOCUMENTS

| | | | |
|---|---|---|---|
| 4,948,844 A | 8/1990 | Nakahara et al. |
| 4,950,724 A | 8/1990 | Malanga et al. |
| 5,032,656 A | 7/1991 | Mares et al. |
| 5,105,047 A | 4/1992 | Waller |
| 5,135,998 A | 8/1992 | Mares et al. |
| 5,182,342 A | 1/1993 | Feiring et al. |
| 5,281,680 A | 1/1994 | Grot |
| 5,286,822 A | 2/1994 | Krespan et al. |
| 5,310,870 A | 5/1994 | Peavy |
| 5,352,749 A | 10/1994 | DeChellis et al. |
| 5,405,922 A | 4/1995 | DeChellis et al. |
| 5,459,212 A | 10/1995 | Krespan et al. |
| 5,478,905 A | 12/1995 | Anolick et al. |
| 5,494,984 A | 2/1996 | Funaki et al. |
| 5,552,500 A | 9/1996 | Peavy |
| 5,556,821 A | 9/1996 | Aida et al. |
| 5,608,002 A | 3/1997 | Kubo et al. |
| 5,624,878 A | 4/1997 | Devore et al. |
| 5,663,251 A | 9/1997 | Kato et al. |
| 5,663,255 A | 9/1997 | Anolick et al. |
| 5,665,838 A | 9/1997 | Peavy |
| 5,668,250 A | 9/1997 | Malik |
| 5,668,251 A | 9/1997 | Malik et al. |
| 5,674,957 A | 10/1997 | DeSimone et al. |
| 5,688,838 A | 11/1997 | Abusleme et al. |
| 5,703,194 A | 12/1997 | Malik et al. |
| 5,769,927 A | 6/1998 | Gottschlich et al. |
| 5,780,565 A | 7/1998 | Clough et al. |
| 5,789,504 A | 8/1998 | Ihara et al. |
| 5,807,977 A | 9/1998 | Malik et al. |
| 5,821,311 A | 10/1998 | Mosbach et al. |
| 5,872,198 A | 2/1999 | Mosbach et al. |
| 5,939,501 A | 8/1999 | DeSimone et al. |
| 5,939,502 A | 8/1999 | DeSimone et al. |
| 5,959,050 A | 9/1999 | Mosbach et al. |
| 5,981,673 A | 11/1999 | DeSimone et al. |
| 5,990,251 A | 11/1999 | Gelus |
| 6,037,483 A | 3/2000 | Malik et al. |
| 6,096,840 A | 8/2000 | Bernier et al. |
| 6,107,423 A | 8/2000 | Wheland et al. |
| 6,111,062 A | 8/2000 | Shirota et al. |
| 6,133,389 A | 10/2000 | Anolick et al. |
| 6,225,367 B1 | 5/2001 | Chaouk et al. |
| 6,228,963 B1 | 5/2001 | Wheland et al. |
| 6,271,319 B1 | 8/2001 | Baker et al. |
| 6,306,989 B1 | 10/2001 | Bloom et al. |
| 6,335,408 B1 | 1/2002 | Russo et al. |
| 6,337,373 B1 | 1/2002 | Formaro et al. |
| 6,346,587 B1 | 2/2002 | Krüger et al. |
| 6,372,838 B1 | 4/2002 | Rao et al. |
| 6,380,351 B1 | 4/2002 | Malik et al. |
| 6,399,729 B1 | 6/2002 | Farnham et al. |
| 6,417,314 B1 | 7/2002 | Malik et al. |
| 6,423,798 B2 | 7/2002 | Wheland et al. |
| 6,448,368 B1 | 9/2002 | Malik et al. |
| 6,455,650 B1 | 9/2002 | Lipian et al. |
| 6,469,116 B2 | 10/2002 | Maccone et al. |
| 6,469,185 B1 | 10/2002 | Russo et al. |
| 6,486,280 B1 | 11/2002 | Anolick et al. |
| 6,534,613 B2 | 3/2003 | Ford et al. |
| 2001/0012880 A1 | 8/2001 | Wheland et al. |
| 2001/0018144 A1 | 8/2001 | Watakabe et al. |
| 2002/0002219 A1 | 1/2002 | Bloom et al. |
| 2002/0028884 A1 | 3/2002 | Formaro et al. |
| 2002/0032291 A1 | 3/2002 | Farnham et al. |
| 2002/0052454 A1 | 5/2002 | Lipian et al. |
| 2002/0055580 A1 | 5/2002 | Lorah et al. |
| 2002/0055581 A1 | 5/2002 | Lorah et al. |
| 2002/0055599 A1 | 5/2002 | Slone |
| 2002/0065383 A1 | 5/2002 | Maccone et al. |
| 2002/0086908 A1 | 7/2002 | Chou et al. |
| 2002/0128411 A1 | 9/2002 | Navarrini et al. |
| 2002/0132910 A1 | 9/2002 | Rao et al. |
| 2002/0151664 A1 | 10/2002 | Farnham et al. |
| 2002/0183457 A1 | 12/2002 | Hintzer et al. |
| 2002/0183471 A1 | 12/2002 | Russo et al. |
| 2003/0023013 A1 | 1/2003 | Lipian et al. |

FOREIGN PATENT DOCUMENTS

| | | |
|---|---|---|
| EP | 0 076 511 | 1/1986 |
| EP | 0 271 243 | 10/1991 |
| EP | 0 369 727 | 2/1994 |
| EP | 0 459 320 | 8/1995 |
| EP | 1 323 746 | 7/2003 |
| EP | 1 347 001 | 4/2006 |
| JP | 61007307 | 1/1986 |
| JP | 7033821 B | 2/1995 |
| JP | 11349606 A | 12/1999 |
| RU | 2195465 | 12/2002 |
| WO | WO92/12182 | 7/1992 |
| WO | WO94/17109 | 8/1994 |
| WO | WO96/24625 | 8/1996 |
| WO | WO96/33227 | 10/1996 |
| WO | WO98/34967 | 8/1998 |
| WO | WO00/47641 | 8/2000 |
| WO | WO00/50209 | 8/2000 |
| WO | WO00/53682 | 9/2000 |
| WO | WO01/49757 | 7/2001 |
| WO | WO01/49758 | 7/2001 |
| WO | WO01/49760 | 7/2001 |
| WO | WO02/04120 | 1/2002 |
| WO | WO02/34794 | 5/2002 |
| WO | WO02/051875 | 7/2002 |
| WO | WO02/059161 | 8/2002 |
| WO | WO2005/113610 | 12/2005 |
| WO | WO2005/113615 | 12/2005 |
| WO | WO2006/002132 | 1/2006 |
| WO | WO2006/009942 | 1/2006 |
| WO | WO2006/009944 | 1/2006 |
| WO | WO2006/009945 | 1/2006 |
| WO | WO2006/009946 | 1/2006 |
| WO | WO2006/009949 | 1/2006 |
| WO | WO2006/009951 | 1/2006 |
| WO | WO2006/009976 | 1/2006 |
| WO | WO2006/009977 | 1/2006 |
| WO | WO2006/009979 | 1/2006 |
| WO | WO2006/009980 | 1/2006 |
| WO | WO2006/009981 | 1/2006 |
| WO | WO2006/019494 | 2/2006 |
| WO | WO2006/025917 | 3/2006 |
| WO | WO2006/028549 | 3/2006 |
| WO | WO2006/083303 | 8/2006 |

OTHER PUBLICATIONS

"Short Chain Branching Effect on the Cloud-Point Pressures of Ethylene Copolymers in Subcritical and Supercritical Propane," S. J. Han et al., Macromolecules 1998, 31, 2533-2538.

"Designing Solvent Solutions," Chemical & Engineering News, Oct. 13, 2003, vol. 81, No. 41.

"Polymer Synthesis Using Hydrofluorocarbon Solvents," Colin Wood et al., Macromolecules, vol. 35, No. 18, 6743-6746, 2002.

"Perfluorinated polyethers for the immobilisation of homogeneous nickel catalysts," W. Keim et al., Journal of Molecular Catalysis A: Chemical 139 (1999) 171-175.

"An Improved Gas-Phase Polypropylene Process," Ross et al., Ind. Eng. Chem. Prod. Res. Dev. 1985, 24, 149-154.

"Adsorption of 1,1,1,2-Tetrafluoroethane on Activated Charcoal," Basavaraj S. Akkimaradi et al., J. Chem. Eng. Data 2001, 46, 417-422.

IMPACT COPOLYMERS

PRIORITY CLAIM

This application is the national phase entry into the United States Patent Office of international application number PCT/US2005/021648 filed Jun. 20, 2005, which claims benefit of and priority to U.S. Provisional Patent Application Ser. No. 60/581,598 filed Jun. 21, 2004.

FIELD OF THE INVENTION

This invention relates to the use of a fluorinated hydrocarbon in a polymerization process to produce impact copolymers.

BACKGROUND OF THE INVENTION

Propylene impact copolymers (ICP's) are commonly used in a variety of applications where strength and impact resistance are desired such as molded and extruded automobile parts, household appliances, luggage and furniture.

Propylene homopolymers alone are often unsuitable for such applications because they are too brittle and have low impact resistance particularly at low temperature, whereas propylene impact copolymers are specifically engineered for applications such as these.

Propylene impact copolymers are typically an intimate mixture of a continuous phase of crystalline propylene homopolymer and dispersed rubbery phase of ethylene-propylene copolymer. While these so-called impact polypropylene products can be produced by melt compounding the individual polymer components, multi-reactor technology makes it possible to directly produce these products. This is conveniently accomplished by polymerizing propylene in a first reactor and transferring the polypropylene homopolymer from the first reactor into a secondary reactor where propylene and ethylene are copolymerized in the presence of the homopolymer.

A large number of processes for preparing homopropylene, known in the art, are used as the first reactor to produce the impact copolymer. These processes include slurry loop reactors, slurry CSTR reactors and gas-phase reactors. In a loop reactor, the first reaction stage consists of one or two tubular loop reactors where bulk polymerization of homopolymers is carried out in liquid propylene. The prepolymerized catalyst, liquid propylene, hydrogen for controlling molecular weight are continuously fed into the reactor in which polymerization takes place at temperatures of 60-80° C. and pressures of up to 4 MPa, preferably 3.5 to 4 MPa. The homopolymer in liquid propylene inside the loops is continuously discharged to a separation unit. Unreacted propylene is recycled to the reaction medium. For impact copolymer production, the polymer produced in the first stage is transferred to one or two gas phase reactors where ethylene, propylene and hydrogen are added to produce impact copolymers. The granules are discharged to a flashing unit for product/monomer separation.

Polymers produced during bulk/slurry polymerizations using hydrocarbon solvents, in particular polymers of low crystallinity and/or low molecular weight, are soluble in the reaction medium. This can cause considerable problems in such bulk/slurry polymerization applications. This problem can be mitigated by operating the polymerization reactor under supercritical condition as disclosed in WO 92/12182. By nature the super critical fluid has lower polymer solving power, and nearly unlimited solubility of gaseous components. Simultaneously, the separation of the recycled reaction medium and recovered polymer is simplified, because of the energy available in the polymerization product. However, supercritical operation requires handling of high pressure equipment and is energy intensive.

Production of low crystallinity and/or low molecular weight polymers also causes in difficulty in the operation of conventional flash systems. Such flash systems are highly sensitive to high soluble polymer fractions. Any non-evaporated liquid in the separation tank risks blocking the device. This is particularly true for cyclone type of devices operated at high pressures.

Propylene polymerizations in a gas-phase process was described in the article by Ross, et al. al., "An Inproved Gas-Phase Polypropylene Process." *Ind. Eng. Chem. Prod. Res. Dev.* 1985, 24, pp. 149-154. The polymerization system consists of a fluidized bed reactor, single-stage centrifugal recycle gas compressor, recycle gas condenser, catalyst feeder and product removal system. This compressor circulates reaction gas upward through the bed, providing the agitation required for fluidization, backmixing and heat removal. No mechanical stirrers or agitators are needed in Unipol process reactors. For production of impact copolymers in the gas-phase a smaller replica of the first reaction system is operated in series. The granular resin is conveyed from the polymerization system to a bin for purging with nitrogen to remove residual hydrocarbons and then to pelletizing. One of the advantages of gas phase processes is the possibility to produce high comonomer content products. High monomer content polymer inherently has low melting or softening temperature. Under such conditions in either a fluidized or stirred gas-solid phase reactor, stickiness of the olefin polymer particles or granules becomes a problem. Ethylene copolymers using propylene, butene-1, and higher alpha comonomers are prone to stickiness problems when their crystallinity is below 30% or densities less than about 910 kg/m$^3$. The stickiness problem becomes even more critical with copolymers of ethylene and propylene having a crystalline content less than 10%. Only limited amount of the low crystallinity copolymer can be produced in the gas-phase reactor due to the sticky nature of low crystallinity copolymer. Presence of the low crystallinity copolymer also limits the polymerization temperature to a relatively low level. Low process temperatures are generally undesired due to reduced conversion efficiency and consequent increased costs of operation. The utilization of a conventional Ziegler-Natta or vanadium based catalyst compositions in such polymerizations also leads to product that is lacking in a desired level of homogeneity and randomness as to comonomer incorporation. Improved homogeneity and random comonomer incorporation is generally desired due to improved product physical properties.

Impact copolymers are typically produced in a sequential process with a combination of at least one slurry reactor and at least one gas-phase reactor. The combined processes posses all the advantages and drawbacks associated with the slurry and gas-phase processes discussed above. While these combined sequential processes are useful, it would be desirable to have an improved process for the production of impact copolymers.

To address these issues, the present invention provides a process to produce impact copolymers using fluorinated hydrocarbons in the polymerization medium of the first and/or second reactors. Such a process may reduce the drawbacks of known two step processes for forming impact copolymers.

U.S. Pat. No. 3,470,143 discloses a process to produce a boiling-xylene soluble polymer in a slurry using certain fluorinated organic carbon compounds.

U.S. Pat. No. 5,990,251 discloses a gas phase process using a Ziegler-Natta catalyst system modified with a halogenated hydrocarbon, such as chloroform.

EP 0 459 320 A2 discloses polymerization in polar aprotic solvents, such as halogenated hydrocarbons.

U.S. Pat. No. 5,780,565 discloses dispersion polymerizations of polar monomers under super-atmospheric conditions such that the fluid is a liquid or supercritical fluid, the fluid being carbon dioxide, a hydrofluorocarbon, a perfluorocarbon or a mixture thereof.

U.S. Pat. No. 5,624,878 discloses the polymerization using "constrained geometry metal complexes" of titanium and zirconium.

U.S. Pat. No. 2,534,698, U.S. Pat. No. 2,644,809 and U.S. Pat. No. 2,548,415 disclose preparation of butyl rubber type elastomers in fluorinated solvents.

U.S. Pat. No. 6,534,613 discloses use of hydrofluorocarbons as catalyst modifiers.

U.S. Pat. No. 4,950,724 disclose the polymerization of vinyl aromatic monomers in suspension polymerization using fluorinated aliphatic organic compounds.

WO 02/34794 discloses free radical polymerizations in certain hydrofluorocarbons.

WO 02/04120 discloses a fluorous bi-phasic systems.

WO 02/059161 discloses polymerization of isobutylene using fluorinated co-initiators.

EP 1 323 746 shows loading of biscyclopentadienyl catalyst onto a silica support in perfluorooctane and thereafter the prepolymerization of ethylene at room temperature.

U.S. Pat. No. 3,056,771 discloses polymerization of ethylene using $TiCl_4/(Et)_3Al$ in a mixture of heptane and perfluoromethylcyclohexane, presumably at room temperature.

Additional references of interest include:
Designing Solvent Solutions, Chemical and Engineering News, Oct. 13, 2003 (www.CEN-online.org); Polymer Synthesis Using Hydrofluorocarbon Solvents., Wood, Colin, et al. Macromolecules, Vol. 35, Number 18, pages 6743-6746, 2002; Perfluorinated Polyethers for the Inmobilisation of Homogeneous Nickel Catalysts, Keim, W. et al., Journal of Molecular Catalysis A: Chemical 139 (1999) 171-175; RU2195465; US20020086908 A1; WO200251875 A1; US2002/0032291 A1; U.S. Pat. No. 3,397,166; U.S. Pat. No. 3,440,219; U.S. Pat. No. 6,111,062; U.S. Pat. No. 5,789,504; U.S. Pat. No. 5,703,194; U.S. Pat. No. 5,663,251; U.S. Pat. No. 5,608,002; U.S. Pat. No. 5,494,984; U.S. Pat. No. 5,310,870; U.S. Pat. No. 5,182,342; U.S. Pat. No. 2,603,626; U.S. Pat. No. 2,494,585; U.S. Pat. No. 2,474,571; WO 02/051875 A1; U.S. Pat. No. 6,133,389; U.S. Pat. No. 6,096,840; U.S. Pat. No. 6,107,423; U.S. Pat. No. 6,037,483; U.S. Pat. No. 5,981,673; U.S. Pat. No. 5,939,502; U.S. Pat. No. 5,939,501; U.S. Pat. No. 5,674,957; U.S. Pat. No. 5,872,198; U.S. Pat. No. 5,959,050; U.S. Pat. No. 5,821,311; U.S. Pat. No. 5,807,977; U.S. Pat. No. 5,688,838; U.S. Pat. No. 5,668,251; U.S. Pat. No. 668,250; U.S. Pat. No. 5,665,838; U.S. Pat. No. 5,663,255; U.S. Pat. No. 5,552,500; U.S. Pat. No. 5,478,905; U.S. Pat. No. 5,459,212; U.S. Pat. No. 5,281,680; U.S. Pat. No. 5,135,998; U.S. Pat. No. 5,105,047; U.S. Pat. No. 5,032,656; U.S. Pat. No. 4,166,165; U.S. Pat. No. 4,123,602; U.S. Pat. No. 4,100,225; U.S. Pat. No. 4,042,634; US 2002/0132910 A1; US 2002/0151664 A1; US 2002/0183457 A1; US 2002/0183471 A1; US 2003/0023013 A1; US 2001/0012880 A1; US 2001/0018144 A1; US 2002/0002219 A1; US 2002/0028884 A1; US 2002/0052454 A1; US 2002/0055580 A1; US 2002/0055581; US 2002/0055599 A1, US 2002/0065383; US 2002/0086908 A1; US 2002/0128411 A1; U.S. Pat. No. 3,269,972, U.S. Pat. No. 3,331,822; U.S. Pat. No. 3,493,530; U.S. Pat. No. 3,528,954; U.S. Pat. No. 3,590,025; U.S. Pat. No. 3,616,371; U.S. Pat. No. 3,642,742; U.S. Pat. No. 3,787,379; U.S. Pat. No. 3,919,183; U.S. Pat. No. 3,996,281; U.S. Pat. No. 4,194,073; U.S. Pat. No. 4,338,237; U.S. Pat. No. 4,381,387; U.S. Pat. No. 4,424,324; U.S. Pat. No. 4,435,553; U.S. Pat. No. 4,452,960; U.S. Pat. No. 4,499,249; U.S. Pat. No. 4,508,881; U.S. Pat. No. 4,535,136; U.S. Pat. No. 4,588,796; U.S. Pat. No. 4,626,608; U.S. Pat. No. 4,736,004; U.S. Pat. No. 4,900,777; U.S. Pat. No. 4,946,936; U.S. Pat. No. 4,948,844; WO00/50209; WO/96/24625; WO 94/17109; WO 0149760 A1; WO 01/49758 A1; WO 01/49757; WO 00/53682; WO 00/47641; U.S. Pat. No. 6,486,280 B1; U.S. Pat. No. 6,469,185 B1; U.S. Pat. No. 6,469,116 B2; U.S. Pat. No. 6,455,650 B1; U.S. Pat. No. 6,448,368 B1; U.S. Pat. No. 6, 423,798 B2; EP 0 076 511 B1; EP 0 271 243 B1; U.S. Pat. No. 6,417,314 B1; U.S. Pat. No. 6,399,729 B1; U.S. Pat. No. 6,380,351 B1; U.S. Pat. No. 6,372,838 B1; U.S. Pat. No. 6,346,587 B1; U.S. Pat. No. 6,337,373 B1; U.S. Pat. No. 6,335,408 B1; U.S. Pat. No. 6,306,989 B1; U.S. Pat. No. 6,228,963 B1; U.S. Pat. No. 6,225,367 B1; JP 7033821 B published Apr. 12, 1995; JP 11349606 A published Dec. 21, 1999; and JP 61007307 published Jan. 14, 1986.

SUMMARY OF THE INVENTION

This invention relates to a continuous process to prepare olefin impact copolymers comprising producing a semi-crystalline olefin polymer in a first reactor and then transferring the reactor contents to a second reactor where a low crystallinity olefin polymer is produced in the presence of the semi-crystalline polymer, where a fluorinated hydrocarbon is present in the polymerization medium of the first reactor, the second reactor or both reactors.

DEFINITIONS

For purposes of this invention and the claims thereto, the term copolymers means any polymer comprising two or more monomers.

For the purposes of this invention and the claims thereto when a polymer is referred to as comprising a monomer, the olefin present in the polymer is the polymerized form of the monomer. Likewise when catalyst components are described as comprising neutral stable forms of the components, it is well understood by one of ordinary skill in the art, that the active form of the component is the form that reacts with the monomers to produce polymers. In addition, a reactor is any container(s) in which a chemical reaction occurs.

As used herein, the new notation numbering scheme for the Periodic Table Groups are used as set out in CHEMICAL AND ENGINEERNG NEWS, 63(5), 27 (1985).

As used herein, Me is methyl, t-Bu and $^tBu$ are tertiary butyl, iPr and $^iPr$ are isopropyl, Cy is cyclohexyl, and Ph is phenyl.

For purposes of this disclosure, the term oligomer refers to compositions having 2-75 mer units and the term polymer refers to compositions having 76 or more mer units. A mer is defined as a unit of an oligomer or polymer that originally corresponded to the monomer(s) used in the oligomerization or polymerization reaction. For example, the mer of polyethylene would be ethylene.

The term "catalyst system" is defined to mean a catalyst precursor/activator pair. When "catalyst system" is used to describe such a pair before activation, it means the unactivated catalyst (precatalyst) together with an activator and, optionally, a co-activator. When it is used to describe such a pair after activation, it means the activated catalyst and the activator or other charge-balancing moiety.

The transition metal compound may be neutral as in a precatalyst, or a charged species with a counter ion as in an activated catalyst system.

Catalyst precursor is also often referred to as precatalyst, catalyst, catalyst compound, catalyst precursor, transition metal compound or transition metal complex. These words are used interchangeably. Activator and cocatalyst are also used interchangeably.

DETAILED DESCRIPTION

This invention relates to a process to prepare impact copolymers comprising producing a semi-crystalline polymer in a first reactor and then transferring the reactor contents to a second reactor where a low crystallinity polymer is produced in the presence of the semi-crystalline polymer, where a fluorinated hydrocarbon is present in the polymerization medium of the first reactor, the second reactor or both reactors. By semi-crystalline polymer is meant that the polymer has at least 20% crystallinity (preferably at least 30%) as determined by differential scanning calorimetric (DSC) trace data obtained using a TA Instruments model 2910 machine. Samples weighing approximately 7-10 mg are sealed in aluminum sample pans. The DSC data are recorded by first cooling the sample to −100° C. and then gradually heating it to 200° C. at a rate of 10° C./minute. The sample is kept at 200° C. for 5 minutes before a second cooling-heating cycle is applied. Both the first and second cycle thermal events are recorded. Areas under the melting curves were measured and used to determine the heat of fusion and the degree of crystallinity. The percent crystallinity was calculated using the formula, [area under the curve (Joules/gram)/B (Joules/gram)]*100, where B is the heat of fusion for the homopolymer of the major monomer component. These values for B are to be obtained from the Polymer Handbook, Fourth Edition, published by John Wiley and Sons, New York 1999. A value of 189 J/g (B) was used as the heat of fusion for 100% crystalline polypropylene. By low crystallinity polymer is meant that the polymer has less than 20% crystallinity as measured by the DSC procedure above, preferably the low crystallinity polymer has a glass transition temperature of Tg of 30C or less as determined by ASTM E 1356 using a TA Instruments model 2910 machine. In a preferred embodiment, the % crystallinity of the semi-crystalline polymer is at least 10% higher than the low crystallinity polymer, preferably at least 20% higher, preferably at least 30% higher, preferably at least 40% higher.

This invention further relates to a process to produce impact polypropylene copolymers using fluorinated hydrocarbons ("FC's"). In another aspect the present invention provides a method for producing less sticky copolymers in impact copolymer systems with the presence of a fluorinated hydrocarbon, preferably a hydrofluorocarbon.

The benefits of using a fluorinated hydrocarbon in a sequential process with at least one slurry reactor and at least one gas-phase reactor, include:

1. Reducing the stickiness of low crystallinity and/or low molecular weight polymers; and or
2. The poor solvency of the FC leads to less swelled polymer resins and makes polymer recovery system easier; and or
3. Increases in the amount of low crystallinity copolymers since this polymer is less soluble or indissoluble in the FC; and or
4. Higher polymerization temperature are possible due to less melting temperature depression.

Another preferred embodiment includes a sequential process where a combination of at least two slurry reactors where the ethylene/propylene copolymer is produced in a slurry reactor. Low crystallinity copolymers are indissoluble in FC. Impact copolymers can be produced by first making homopolypropylene in a slurry reactor, and transferring the homopolypropylene to another slurry reactor where copolymers are produced in the presence of homopolypropylene.

A typical impact copolymer produced herein contains at least two phases or components, e.g., a continuous phase and a disperse phase. The impact copolymer may also comprise additional phases (such as a PP/EP/PE combination with PP continuous and a dispersed phase with EP outside and PE inside the dispersed phase particles). While one can produce impact copolymers by physically blending the different components, the components are usually produced in a sequential polymerization process wherein the continuous phase (such as a propylene homopolymer) is produced in a first reactor and is then transferred to a second reactor where the disperse phase (such as an ethylene/propylene copolymer) is produced and incorporated within the matrix of the continuous phase component. Generally the continuous phase has thermoplastic properties such as stiffness and the disperse phase has rubbery characteristics and provides the desired impact resistance. While typically the continuous phase is prepared first, it is not required. In some methods one may produce the disperse phase first then transfer the reactor contents to a second reactor for production of the continuous phase.

Preferred impact copolymers may be a reactor blend (in situ blend) or a post reactor (ex-situ) blend. In one embodiment, a suitable impact copolymer comprises from 40% to 95% by weight of the continuous phase ("Component A") and from 5% to 60% by weight of the disperse phase ("Component B") based on the total weight of the impact copolymer.

In a preferred embodiment, Component A comprises propylene homopolymer or copolymer, the copolymer comprising 10% or less by weight ethylene, butene, hexene or octene comonomer, and Component B comprises propylene copolymer, wherein the copolymer comprises from 5% to 70% by weight ethylene, butene, hexene and/or octene comonomer, and from about 95% to about 30% by weight propylene. In one embodiment of the impact copolymer, Component B consists essentially of propylene and from about 30% to about 65% by weight ethylene. In another embodiment, Component B comprises ethylene-propylene copolymers, ethylene-propylene-diene terpolymers, ethylene-acrylate copolymers, ethylene-vinyl acetate, styrene-butadiene copolymers, ethylene-acrylic ester copolymers, polybutadiene, polyisoprene, natural rubber, isobutylene, hydrocarbon resin (the hydrocarbon resin being characterized by a molecular weight less than 5000, a $T_g$ of about 50 to 100° C. and a softening point, Ring and Ball, as measured by ASTM E-28, of less than about 140° C.), rosin ester, and mixtures thereof. In another embodiment, Component B has a molecular weight distribution of less than 3.5. In yet another embodiment, Component B has a weight average molecular weight of at least 20,000.

The ICP's preferably comprise from about 40% to about 95% by weight Component A and from about 5% to about 60% by weight Component B, preferably from 50% to about 95% by weight Component A and from about 5% to about 50% Component B, even more preferably from about 60% to about 90% by weight Component A and from about 10% to about 40% by weight Component B. In the most preferred embodiment, the ICP consists essentially of Components A and B. The overall comonomer (preferably ethylene) content of the total ICP is preferably in the range of from about 2% to about 30% by weight, preferably from about 5% to about 25% by weight, even more preferably from about 5% to about 20% by weight, still more preferably from about 5% to about 15% by weight comonomer.

The preferred melt flow rate ("MFR") of these ICP's depends on the desired end use but is typically in the range of from about 0.2 dg/min to about 2000 dg/min, more preferably from about 5 dg/min to about 100 dg/min. Significantly, high MFRs, i.e., higher than 50 dg/min are obtainable. The ICP preferably has a melting point (Tm) of at least 145° C., preferably at least 150° C., more preferably at least 152° C., and most preferably at least 155° C.

The ICP's of the present invention are preferably prepared in a sequential polymerization where a fluorocarbon is introduced into the process. The fluorocarbon may be introduced before, during, or after polymerization into the polymerization medium or the effluent. In particular the fluorocarbon may be introduced into the polymer composition exiting the first reactor prior to entry into the second reactor. Alternately the fluorocarbon may be introduced in the first reactor, the second reactor of both. The fluorocarbons may be introduced with the monomer(s), catalyst components, or other additives or may be introduced separately. Likewise the fluorocarbon may be added at the reactor exit or during recovery processes after the polymer has exited the reactor.

In a preferred embodiment, a sequential polymerization process is used and the first polymerization is a slurry process to produce homopolymer followed by a gas-phase process for impact copolymer production. The slurry process can be a loop reactor or a CSTR type of reactor. In a loop reactor, the first reaction stage consists of one or two tubular loop reactors where bulk polymerization of homopolymers is carried out in liquid propylene. The prepolymerized catalyst, liquid propylene, hydrogen for controlling molecular weight are continuously fed into the reactor. The homopolymer in liquid propylene inside the loops is continuously discharged to a separation unit. Unreacted propylene is recycled to the reaction medium while the polymer is transferred to one or two gas phase reactors where ethylene, propylene and hydrogen are added to produce the impact copolymers. The granules are discharged to the monomer flashing and recovery section and sent to a monomer stripping system. After the drying unit, the granular resin is conveyed to an extrusion system for stabilization, and pelletization. In a preferred embodiment, the fluorocarbon is introduced into the first loop reactor.

Polypropylene produced in the reaction medium with presence of FC solvent has less melting temperature depression. The polymerization process can be operated at higher reaction temperature as compared with a system where hydrocarbon solvent or bulk propylene is used. Preferably, the reaction temperature is 120° C. or less. Higher operating temperature also leads better heat removal.

In any of the embodiments described herein the materials stripped or flashed off may be passed through activated carbon to remove all or part of the FC's.

Introduction of FC to the gas-phase reactor where polymerization of ethylene/propylene copolymer occurs has the following benefits:

1. Reduces the stickiness of low crystallinity and/or low molecular weight polymers; and or
2. Poor solvency of FC leads less swelled polymer resins and makes polymer recovery system easier; and or
3. Increases the amount of low crystallinity copolymers since this polymer is less soluble or indissoluble in FC; and or
4. Higher polymerization temperatures are possible due to less melting temperature depression.

In another embodiment, the fluorocarbon is introduced into both the loop reactor and gas-phase reactor.

In another embodiment, the sequential process consist of a first-stage homopolymerization in a bulk, loop reactor, fines removal cyclone between the first and second stage, a second-stage homopolymerization in a gas phase reactor and finally impact copolymerization in an additional gas phase reactor. The fluorocarbon is preferably introduced into the bulk homopolymerization reactor. Alternately, the fluorocarbon is introduced into the gas-phase reactor for polypropylene production. In another embodiment, the fluorocarbon is introduced into the gas-phase reactor for impact polymer production. In another embodiment, the fluorocarbon is introduced into all the bulk polymerization reactors and gas-phase reactors. In another embodiment, the sequential process comprises a combination of a slurry reactor and a gas phase reactor. The polymer slurry from the slurry reactor is fed into a classifying system placed between propylene polymerization reactor, and a slurry containing coarse particles is supplied to a flash vessel for gas separation and polymer is then fed to an ethylene-propylene copolymerization reactor, while the slurry containing fines is returned to the slurry reactor. Preferably the fluorocarbon is introduced into the gas-phase reactor for impact copolymer production. Alternately, the fluorocarbon is introduced into the slurry reactor for polypropylene production. In another embodiment, the fluorocarbon is introduced into both the bulk polymerization reactors and gas-phase reactors.

In another embodiment, a sequential polymerization process is used and the first polymerization is a slurry process to produce homopolymer followed by another slurry reactor for impact copolymer production. Impact copolymers can be produced by first making homopolypropylene in a slurry reactor, and transferring the homopolypropylene to another slurry reactor where copolymers are produced with the presence of homopolypropylene. FC is introduced into the first reactor, the second reactor or both.

In a preferred embodiment, the fluorocarbons are present in the polymerization media at 0.1 to 99 volume %, based upon the volume of the media, preferably the fluorocarbons are present at 1 to 90 volume %, preferably 5 to 70 volume %, preferably 10 to 50 volume %, more preferably at 20 to 50 volume %, more preferably 30 to 50 volume %. For purposes of this invention and the claims thereto polymerization media means the mixture of monomer, polymer produced, solvent added to the reactor.

In another embodiment, the two (or more) polymerizations occur in the same reactor but in different reaction zones. For example, another preferred embodiment is process to prepare impact copolymers comprising producing a semi-crystalline polymer in a first reaction zone and then transferring the semi-crystalline polymer to a second reaction zone where a low crystallinity polymer is produced in the presence of the semi-crystalline polymer, where a fluorinated hydrocarbon is present in the polymerization medium of the first reaction zone, the second reaction zone or both reaction zones.

In any of the embodiments above the first reactor and second reactor may be reaction zones in the same reactor. Reactors where multiple reaction zones are possible include Spherizone™ type reactors and those described in U.S. Pat. No. 6,413,477.

Fluorocarbons

The polymerization processes of this invention are preferably conducted in the presence of a perfluorocarbon ("PFC" or "PFC's") or a hydrofluorocarbon ("HFC" or "HFC's"), collectively referred to as "fluorinated hydrocarbons" or "fluorocarbons" ("FC" or "FC's").

Fluorocarbons are defined to be compounds consisting essentially of at least one carbon atom and at least one fluorine atom, and optionally hydrogen atom(s). A perfluorocarbon is a compound consisting essentially of carbon atom and fluorine atom, and includes for example linear branched or cyclic, $C_1$ to $C_{40}$ perfluoroalkanes. A hydrofluorocarbon is a compound consisting essentially of carbon, fluorine and hydrogen. Preferred FC's include those represented by the formula: $C_xH_yF_z$ wherein x is an integer from 1 to 40, alternatively from 1 to 30, alternatively from 1 to 20, alternatively from 1 to 10, alternatively from 1 to 6, alternatively from 2 to 20 alternatively from 3 to 10, alternatively from 3 to 6, most preferably from 1 to 3, wherein y is greater than or equal 0 and z is an integer and at least one, more preferably, y and z are integers and at least one. In a preferred embodiment, z is 2 or more. Preferred perfluorocarbons include those where y is zero and x is an integer from 1 to 40, alternatively from 1 to 30, alternatively from 1 to 20, alternatively from 1 to 10, alternatively from 1 to 6, alternatively from 2 to 20 alternatively from 3 to 10, alternatively from 3 to 6, most preferably from 1 to 3. For purposes of this invention and the claims thereto, the terms hydrofluorocarbon and fluorocarbon do not include chlorofluorocarbons.

In one embodiment, a mixture of fluorocarbons are used in the process of the invention, preferably a mixture of a perfluorinated hydrocarbon and a hydrofluorocarbon, and more preferably a mixture of a hydrofluorocarbons. In yet another embodiment, the hydrofluorocarbon is balanced or unbalanced in the number of fluorine atoms in the HFC used.

Non-limiting examples of fluorocarbons useful in this invention include fluoromethane; difluoromethane; trifluoromethane; fluoroethane; 1,1-difluoroethane; 1,2-difluoroethane; 1,1,1-trifluoroethane; 1,1,2-trifluoroethane; 1,1,1,2-tetrafluoroethane; 1,1,2,2-tetrafluoroethane; 1,1,1,2,2-pentafluoroethane; 1-fluoropropane; 2-fluoropropane; 1,1-difluoropropane; 1,2-difluoropropane; 1,3-difluoropropane; 2,2-difluoropropane; 1,1,1-trifluoropropane; 1,1,2-trifluoropropane; 1,1,3-trifluoropropane; 1,2,2-trifluoropropane; 1,2,3-trifluoropropane; 1,1,1,2-tetrafluoropropane; 1,1,1,3-tetrafluoropropane; 1,1,2,2-tetrafluoropropane; 1,1,2,3-tetrafluoropropane; 1,1,3,3-tetrafluoropropane; 1,2,2,3-tetrafluoropropane; 1,1,1,2,2-pentafluoropropane; 1,1,1,2,3-pentafluoropropane; 1,1,1,3,3-pentafluoropropane; 1,1,2,2,3-pentafluoropropane; 1,1,2,3,3-pentafluoropropane; 1,1,1,2,2,3-hexafluoropropane; 1,1,1,2,3,3-hexafluoropropane; 1,1,1,3,3,3-hexafluoropropane; 1,1,1,2,2,3,3-heptafluoropropane; 1,1,1,2,3,3,3-heptafluoropropane; 1-fluorobutane; 2-fluorobutane; 1,1-difluorobutane; 1,2-difluorobutane; 1,3-difluorobutane; 1,4-difluorobutane; 2,2-difluorobutane; 2,3-difluorobutane; 1,1,1-trifluorobutane; 1,1,2-trifluorobutane; 1,1,3-trifluorobutane; 1,1,4-trifluorobutane; 1,2,2-trifluorobutane; 1,2,3-trifluorobutane; 1,3,3-trifluorobutane; 2,2,3-trifluorobutane; 1,1,1,2-tetrafluorobutane; 1,1,1,3-tetrafluorobutane; 1,1,1,4-tetrafluorobutane; 1,1,2,2-tetrafluorobutane; 1,1,2,3-tetrafluorobutane; 1,1,2,4-tetrafluorobutane; 1,1,3,3-tetrafluorobutane; 1,1,3,4-tetrafluorobutane; 1,1,4,4-tetrafluorobutane; 1,2,2,3-tetrafluorobutane; 1,2,2,4-tetrafluorobutane; 1,2,3,4-tetrafluorobutane; 2,2,3,3-tetrafluorobutane; 1,1,1,2,2-pentafluorobutane; 1,1,1,2,3-pentafluorobutane; 1,1,1,2,4-pentafluorobutane; 1,1,1,3,3-pentafluorobutane; 1,1,1,3,4-pentafluorobutane; 1,1,1,4,4-pentafluorobutane; 1,1,2,2,3-pentafluorobutane; 1,1,2,2,4-pentafluorobutane; 1,1,2,3,3-pentafluorobutane; 1,1,2,4,4-pentafluorobutane; 1,2,2,3,3-pentafluorobutane; 1,1,1,2,2,3-hexafluorobutane; 1,1,1,2,2,4-hexafluorobutane; 1,1,1,2,3,3-hexafluorobutane, 1,1,1,2,3,4-hexafluorobutane; 1,1,1,2,4,4-hexafluorobutane; 1,1,1,3,3,4-hexafluorobutane; 1,1,1,3,4,4-hexafluorobutane; 1,1,1,4,4,4-hexafluorobutane; 1,1,2,2,3,3-hexafluorobutane; 1,1,2,2,3,4-hexafluorobutane; 1,1,2,2,4,4-hexafluorobutane; 1,1,2,3,3,4-hexafluorobutane; 1,1,2,3,4,4-hexafluorobutane; 1,2,2,3,3,4-hexafluorobutane; 1,1,1,2,2,3,3-heptafluorobutane; 1,1,1,2,2,4,4-heptafluorobutane; 1,1,1,2,2,3,4-heptafluorobutane; 1,1,1,2,3,3,4-heptafluorobutane; 1,1,1,2, 3,4,4-heptafluorobutane; 1,1,1,2,4,4,4-heptafluorobutane; 1,1,1,3,3,4,4-heptafluorobutane; 1,1,1,2,2,3,3,4-octafluorobutane; 1,1,1,2,2,3,4,4-octafluorobutane; 1,1,1,2,3,3,4,4-octafluorobutane; 1,1,1,2,2,4,4,4-octafluorobutane; 1,1,1,2,3,4,4,4-octafluorobutane; 1,1,1,2,2,3,3,4-nonafluorobutane; 1,1,1,2,2,3,4,4-nonafluorobutane; 1-fluoro-2-methylpropane; 1,1-difluoro-2-methylpropane; 1,3-difluoro-2-methylpropane; 1,1,1-trifluoro-2-methylpropane; 1,1,3-trifluoro-2-methylpropane; 1,3-difluoro-2-(fluoromethyl)propane; 1,1,1,3-tetrafluoro-2-methylpropane; 1,1,3,3-tetrafluoro-2-methylpropane; 1,3-trifluoro-2-(fluoromethyl)propane; 1,1,1,3,3-pentafluoro-2-methylpropane; 1,1,3,3-tetrafluoro-2-(fluoromethyl)propane; 1,1,1,3-tetrafluoro-2-(fluoromethyl)propane; fluorocyclobutane; 1,1-difluorocyclobutane; 1,2-difluorocyclobutane; 1,3-difluorocyclobutane; 1,1,2-trifluorocyclobutane; 1,1,3-trifluorocyclobutane; 1,2,3-trifluorocyclobutane; 1,1,2,2-tetrafluorocyclobutane; 1,1,3,3-tetrafluorocyclobutane; 1,1,2,2,3-pentafluorocyclobutane; 1,1,2,3,3-pentafluorocyclobutane; 1,1,2,2,3,3-hexafluorocyclobutane; 1,1,2,2,3,4-hexafluorocyclobutane; 1,1,2,3,3,4-hexafluorocyclobutane; 1,1,2,2,3,3,4-heptafluorocyclobutane. Particularly preferred fluorocarbons include difluoromethane, trifluoromethane, 1,1-difluoroethane, 1,1,1-trifluoroethane, fluoromethane, and 1,1,1,2-tetrafluoroethane. In addition to those fluorocarbons described herein, those fluorocarbons described in Raymond Will, et. al., CEH Marketing Report, Fluorocarbons, Pages 1-133, by the Chemical Economics Handbook-SRI International, April 2001, which is fully incorporated herein by reference, are included.

In another preferred embodiment, the fluorocarbon(s) used in the process of the invention are selected from the group consisting of difluoromethane, trifluoromethane, 1,1-difluoroethane, 1,1,1-trifluoroethane, and 1,1,1,2-tetrafluoroethane and mixtures thereof.

In one particularly preferred embodiment, the commercially available fluorocarbons useful in the process of the invention include HFC-236fa having the chemical name 1,1,1,3,3,3-hexafluoropropane, HFC-134a having the chemical name 1,1,1,2-tetrafluoroethane, HFC-245fa having the chemical name 1,1,1,3,3-pentafluoropropane, HFC-365mfc having the chemical name 1,1,1,3,3-pentafluorobutane, R-318 having the chemical name octafluorocyclobutane, and HFC-43-10mee having the chemical name 2,3-dihydrodecafluoropentane.

In another embodiment, the fluorocarbon is not a perfluorinated C4 to C10 alkane. In another embodiment, the fluorocarbon is not a perfluorinated hydrocarbon. In another embodiment, the fluorocarbon is not perfluorodecalin, perfluoroheptane, perfluorohexane, perfluoromethylcyclohexane, perfluorooctane, perfluoro-1,3-dimethylcyclohexane, perfluorononane, fluorobenzene, or perfluorotoluene. In a particularly preferred embodiment, the fluorocarbon consists essentially of hydrofluorocarbons.

In another embodiment the fluorocarbon is present at more than 1 weight %, based upon the weight of the fluorocarbon and any hydrocarbon solvent present in the reactor, preferably greater than 3 weight %, preferably greater than 5 weight %, preferably greater than 7 weight %, preferably greater than 10 weight %, preferably greater than 15 weight %, preferably greater than 20 weight %, preferably greater than 25 weight %, preferably greater than 30 weight %, preferably greater than 35 weight %, preferably greater than 40 weight %, preferably greater than 50 weight %, preferably greater than 55 weight %, preferably greater than 60 weight %, preferably greater than 70 weight %, preferably greater than 80 weight %, preferably greater than 90 weight %. In another embodiment the fluorocarbon is present at more than 1 weight %, based upon the weight of the fluorocarbons, monomers and any hydrocarbon solvent present in the reactor, preferably greater than 3 weight %, preferably greater than 5 weight %, preferably greater than 7 weight %, preferably greater than 10 weight %, preferably greater than 15 weight %, preferably greater than 20 weight %, preferably greater than 25 weight %, preferably greater than 30 weight %, preferably greater than 35 weight %, preferably greater than 40 weight %, preferably greater than 50 weight %, preferably greater than 55 weight %, preferably greater than 60 weight %, preferably greater than 70 weight %, preferably greater than 80 weight %, preferably greater than 90 weight %. In the event that the weight basis is not named for the weight % fluorocarbon, it shall be presumed to be based upon the total weight of the fluorocarbons, monomers and hydrocarbon solvents present in the reactor.

In another embodiment the fluorocarbon, preferably the hydrofluorocarbon, is present at more than 1 volume %, based upon the total volume of the fluorocarbon and any hydrocarbon solvent present in the reactor, preferably greater than 3 volume %, preferably greater than 5 volume %, preferably greater than 7 volume %, preferably greater than 10 volume %, preferably greater than 15 volume %, preferably greater than 20 volume %, preferably greater than 25 volume %, preferably greater than 30 volume %, preferably greater than 35 volume %, preferably greater than 40 volume %, preferably greater than 45 volume %, preferably greater than 50 volume %, preferably greater than 55 volume %, preferably greater than 60 volume %, preferably greater than 65 volume %.

In another embodiment the fluorocarbon is a blend of hydrofluorocarbon and perfluorocarbon and preferably the hydrofluorocarbon is present at more than 1 volume %, based upon the total volume of the perfluorocarbon and the hydrofluorocarbon present in the reactor, (with the balance being made up by the perfluorocarbon) preferably greater than 3 volume %, preferably greater than 5 volume %, preferably greater than 7 volume %, preferably greater than 10 volume %, preferably greater than 15 volume %, preferably greater than 20 volume %, preferably greater than 25 volume %, preferably greater than 30 volume %, preferably greater than 35 volume %, preferably greater than 40 volume %, preferably greater than 45 volume %, preferably greater than 50 volume %, preferably greater than 55 volume %, preferably greater than 60 volume %, preferably greater than 65 volume %.

In yet another embodiment, the fluorocarbons of the invention have a weight average molecular weight (Mw) greater than 30 a.m.u., preferably greater than 35 a.m.u, and more preferably greater than 40 a.m.u. In another embodiment, the fluorocarbons of the invention have a Mw greater than 60 a.m.u, preferably greater than 65 a.m.u, even more preferably greater than 70 a.m.u, and most preferably greater than 80 a.m.u. In still another embodiment, the fluorocarbons of the invention have a Mw greater than 90 a.m.u, preferably greater than 100 a.m.u, even more preferably greater than 135 a.m.u, and most preferably greater than 150 a.m.u. In another embodiment, the fluorocarbons of the invention have a Mw greater than 140 a.m.u, preferably greater than 150 a.m.u, more preferably greater than 180 a.m.u, even more preferably greater than 200 a.m.u, and most preferably greater than 225 a.m.u. In an embodiment, the fluorocarbons of the invention have a Mw in the range of from 90 a.m.u to 1000 a.m.u, preferably in the range of from 100 a.m.u to 500 a.m.u, more preferably in the range of from 100 a.m.u to 300 a.m.u, and most preferably in the range of from about 100 a.m.u to about 250 a.m.u.

In yet another embodiment, the fluorocarbons of the invention have normal boiling point in the range of from about −100° C. up to the polymerization temperature, preferably up to about 70° C., preferably up to about 85 to 115° C., preferably the normal boiling point of the fluorocarbons is in the range of from −80° C. to about 90° C., more preferably from about −60° C. to about 85° C., and most preferably from about −50° C. to about 80° C. In an embodiment, the fluorocarbons of the invention have normal boiling point greater than −50° C., preferably greater than −50° C. to less than −10° C. In a further embodiment, the fluorocarbons of the invention have normal boiling point greater than −5° C., preferably greater than −5° C. to less than −20° C. In one embodiment, the fluorocarbons of the invention have normal boiling point greater than 10° C., preferably greater than 10° C. to about 60° C.

In another embodiment, the fluorocarbons of the invention have a liquid density @20° C. (g/cc)less than 2 g/cc, preferably less than 1.6, preferably less than 1.5 g/cc, preferably less than 1.45 g/cc, preferably less than 1.40, and most preferably less than 1.20 g/cc.

In one embodiment, the fluorocarbons of the invention have a ΔH Vaporization at the normal boiling point as measured by standard calorimetry techniques in the range between 100 kJ/kg to less than 500 kJ/kg, preferably in the range of from 110 kJ/kg to less than 450 kJ/kg, and most preferably in the range of from 120 kJ/kg to less than 400 kJ/kg.

In another preferred embodiment, the fluorocarbons of the invention have any combination of two or more of the aforementioned Mw, normal boiling point, ΔH Vaporization, and liquid density values and ranges. In a preferred embodiment, the fluorocarbons useful in the process of the invention have a Mw greater than 30 a.m.u, preferably greater than 40 a.m.u, and a liquid density less than 2.00 g/cc, preferably less than 1.8 g/cc. In yet another preferred embodiment, the fluorocarbons useful in the process of the invention have a liquid density less than 1.9 g/cc, preferably less than 1.8 g/cc, and a normal boiling point greater than −100° C., preferably greater than −50° C. up to the polymerization temperature of the process, (such as up to 115° C.), preferably less than 100° C., and more preferably less than 90° C., and most preferably less than 60° C., and optionally a ΔH Vaporization in the range from 120 kj/kg to 400 kj/kg.

In another embodiment the fluorocarbons are used in combination with one or more hydrocarbon solvents. Preferably, the hydrocarbon solvent is an aliphatic or aromatic hydrocarbon fluids. Examples of suitable, preferably inert, solvents include, for example, saturated hydrocarbons containing from 1 to 10, preferably 3 to 8 carbon atoms, such as propane, n-butane, isobutane, cyclopentane, n-pentane, isopentane, neopentane, n-hexane, isohexane, cyclohexane and other saturated $C_6$ to $C_8$ hydrocarbons. Preferred hydrocarbon fluids also include desulphurized light virgin naphtha and alkanes (preferably C1 to C8 alkanes), such as propane, isobutane, mixed butanes, hexane, pentane, isopentane, octane, isooctane, cyclohexane and octane. Likewise one may also use mixtures of C3 to C20 paraffins and isoparaffins, preferably paraffinic/isoparrifinic mixtures of C4, C5 and or C6 alkanes.

In another embodiment, the fluorocarbon fluid is selected based upon its solubility or lack thereof in a particular polymer being produced. Preferred fluorocarbons have little to no solubility in the polymer. Solubility in the polymer is measured by forming the polymer into a film of thickness between 50 and 100 microns, then soaking it in fluorocarbon (enough to cover the film) for 4 hours at the relevant desired polymerization temperature and pressure in a sealed container or vessel. The film is removed from the fluorocarbon, exposed for 90 seconds to evaporate excess fluorocarbon from the surface of the film, and weighed. The mass uptake is defined as the percentage increase in the film weight after soaking. The fluorocarbon or fluorocarbon mixture is selected so that the polymer has a mass uptake of less than 4 wt %, preferably less than 3 wt %, more preferably less mass uptake of less than 4 wt %, preferably less than 3 wt %, more preferably less than 2 wt %, even more preferably less than 1 wt %, and most preferably less than 0.5 wt %. preferably, the HFC's or mixtures thereof, are selected such that the polymer melting temperature Tm is reduced (or depressed) by not more than 15° C. by the presence of the fluorocarbon. The depression of the polymer melting temperature ΔTm is determined by first measuring the melting temperature of a polymer by differential scanning calorimetry (DSC), and then comparing this to a similar measurement on a sample of the same polymer that has been soaked with the fluorocarbon for four hours. In general, the melting temperature of the soaked polymer will be lower than that of the dry polymer. The difference in these measurements is taken as the melting point depression ΔTm. Higher concentrations of dissolved materials in the polymer cause larger depressions in the polymer melting temperature (i.e. higher values of ΔTm). A suitable DSC technique for determining the melting point depression is described by, P. V. Hemmingsen, "Phase Equilibria in Polyethylene Systems", Ph.D Thesis, Norwegian University of Science and Technology, March 2000, which is incorporated herein by reference. (A preferred set of conditions for conducting the tests are summarized on Page 112 of this reference.) The polymer melting temperature is first measured with dry polymer, and then repeated with the polymer immersed in liquid (the fluorocarbon to be evaluated). As described in the reference above, it is important to ensure that the second part of the test, conducted in the presence of the liquid, is done in a sealed container so that the liquid is not flashed during the test, which could introduce experimental error. In one embodiment, the ΔTm is less than 12° C., preferably less than 10° C., preferably less than 8° C., more preferably less than 6° C., and most preferably less than 4° C. In another embodiment, the measured ΔTm is less than 5° C., preferably less than 4° C., more preferably less than 3° C., even more preferably less than 2° C., and most preferably less than 1° C.

In a preferred embodiment, the fluorocarbon(s) or mixtures thereof, preferably, the fluorocarbon or mixtures thereof, are selected such that these are miscible to the hydrocarbon solvent and liquid monomers when a mixture is used. By miscible is meant that the FC and the hydrocarbon mixture will not have liquid phase separation. Liquid phase separation is determined by mixing a fluorocarbon and a hydrocarbon in a vessel with sight glass at polymerization conditions, then visually observing if phase separation occurs after vigorous mixing for five minutes.

In another embodiment the fluorocarbon is present at more than 5 weight %, based upon the weight of the fluorocarbon and any hydrocarbon solvent present in the reactor, preferably greater than 7 weight %, preferably greater than 10 weight %, preferably greater than 15 weight %.

Ideally, the fluorocarbon is inert to the polymerization reaction. By "inert to the polymerization reaction" is meant that the fluorocarbon does not react chemically with the, monomers, catalyst system or the catalyst system components. (This is not to say that the physical environment provided by an FC's does not influence the polymerization reactions, in fact, it may do so to some extent, such as affecting activity rates. However, it is meant to say that the FC's are not present as part of the catalyst system.)

Polymerization Process

For purposes of this invention and the claims thereto, by continuous is meant a system that operates (or is intended to operate) without interruption or cessation. For example a continuous process to produce a polymer would be one where the reactants are continually introduced into one or more reactors and polymer product is continually withdrawn.

In a preferred embodiment any of the polymerization process described herein are a continuous process.

In a preferred embodiment, the catalyst systems described herein are used in a polymerization process to produce impact copolymers, particularly ethylene and or propylene based impact copolymers. The polymerization may occur in solution phase, supercritical phase, slurry phase, gas phase, bulk phase or a combination thereof. In a preferred embodiment, when a sequential polymerization method is used, the first polymerization may be in the same or different phase from the second polymerization, preferably the first polymerization is in a different phase from the second polymerization. For example, when a sequential polymerization method is used, the first polymerization is in slurry phase and the second is in gas phase. In another embodiment, both the two reactors are in slurry phase with the first polymerization taking place in the first slurry reactor to produce homopolypropylene and the second polymerization take place in the second reactor to produce copolymers. In another embodiment, more than two reactors are employed in the sequential polymerization. In another embodiment, the polymerization temperature is above room temperature (23° C.), preferably above 30° C., preferably above 50° C., preferably above 70° C.

Gas Phase Polymerization

Generally, in a fluidized gas bed process used for producing polymers, a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer. (See for example U.S. Pat. Nos. 4,543,399, 4,588,790, 5,028,670, 5,317,036, 5,352, 749, 5,405,922, 5,436,304, 5,453,471, 5,462,999, 5,616,661 and 5,668,228 all of which are fully incorporated herein by reference.)

The reactor pressure in a gas phase process may vary from about 10 psig (69 kPa) to about 500 psig (3450 kPa), preferably from about 100 psig (690 kPa) to about 500 psig (3450 kPa), preferably in the range of from about 200 psig (1380 kPa) to about 400 psig (2759 kPa), more preferably in the range of from about 250 psig (1724 kPa) to about 350 psig (2414 kPa).

The reactor temperature in the gas phase process may vary from about 30° C. to about 120° C., preferably from about 60° C. to about 115° C., more preferably in the range of from about 70° C. to 110° C., and most preferably in the range of from about 70° C. to about 95° C. In another embodiment when high density polyethylene is desired then the reactor temperature is typically between 70 and 105° C.

The productivity of the catalyst or catalyst system in a gas phase system is influenced by the partial pressure of the main monomer. The preferred mole percent of the main monomer, ethylene or propylene, preferably ethylene, is from about 25 to 90 mole percent and the comonomer partial pressure is in the range of from about 138 kPa to about 517 kPa, preferably about 517 kPa to about 2069 kPa, which are typical conditions in a gas phase polymerization process. Also in some systems the presence of comonomer can increase productivity.

In a preferred embodiment, the reactor utilized in the present invention is capable of producing more than 500 lbs of polymer per hour (227 Kg/hr) to about 200,000 lbs/hr (90,900 Kg/hr) or higher, preferably greater than 1000 lbs/hr (455 Kg/hr), more preferably greater than 10,000 lbs/hr (4540 Kg/hr), even more preferably greater than 25,000 lbs/hr (11,300 Kg/hr), still more preferably greater than 35,000 lbs/hr (15,900 Kg/hr), still even more preferably greater than 50,000 lbs/hr (22,700 Kg/hr) and preferably greater than 65,000 lbs/hr (29,000 Kg/hr) to greater than 100,000 lbs/hr (45,500 Kg/hr), and most preferably over 100,000 lbs/hr (45,500 Kg/hr).

The polymerization in a stirred bed takes place in one or two horizontal stirred vessels according to the polymerization mode. The reactors are preferably subdivided into individually gas-composition-controllable and polymerization-temperature-controllable polymerization compartments. With continuous catalyst injection, essentially at one end of the reactor, and powder removal at the other end, the residence time distribution approaches that of plug flow reactor. Preferably the fluorocarbon is introduced into the first stirred vessel.

Other gas phase processes contemplated by the process of the invention include those described in U.S. Pat. Nos. 5,627,242, 5,665,818 and 5,677,375, and European publications EP-A-0 794 200, EP-A-0 802 202 and EP-B-634 421 all of which are herein fully incorporated by reference.

In another preferred embodiment the catalyst system is in liquid form and is introduced into the gas phase reactor into a resin particle lean zone. For information on how to introduce a liquid catalyst system into a fluidized bed polymerization into a particle lean zone, please see U.S. Pat. No. 5,693,727, which is incorporated by reference herein.

In some embodiments, the gas phase polymerization operates in the absence of fluorocarbon. In some embodiments, the gas phase polymerization is conducted in the presence of a fluorocarbon. Generally speaking the fluorocarbons may be used as polymerization media and or as condensing agents.

Slurry Phase Polymerization

A slurry polymerization process generally operates between 1 to about 50 atmosphere pressure range (15 psi to 735 psi, 103 kPa to 5068 kPa) or even greater and temperatures in the range of 0C to about 120° C. In a slurry polymerization, a suspension of solid, particulate polymer is formed in a liquid polymerization diluent medium to which monomer and comonomers along with catalyst are added. The suspension including diluent is intermittently or continuously removed from the reactor where the volatile components are separated from the polymer and recycled, optionally after a distillation, to the reactor. The liquid diluent employed in the polymerization medium is typically an alkane having from 3 to 7 carbon atoms, preferably a branched alkane. The medium employed should be liquid under the conditions of polymerization and relatively inert. When a propane medium is used the process should be operated above the reaction diluent critical temperature and pressure. Preferably, a hexane or an isobutane medium is employed.

In one embodiment, a preferred polymerization technique of the invention is referred to as a particle form polymerization, or a slurry process where the temperature is kept below the temperature at which the polymer goes into solution. Such technique is well known in the art, and described in for instance U.S. Pat. No. 3,248,179 which is fully incorporated herein by reference. The preferred temperature in the particle form process is within the range of about 20° C. to about 110° C. Two preferred polymerization methods for the slurry process are those employing a loop reactor and those utilizing a plurality of stirred reactors in series, parallel, or combinations thereof. Non-limiting examples of slurry processes include continuous loop or stirred tank processes. Also, other examples of slurry processes are described in U.S. Pat. No. 4,613,484, which is herein fully incorporated by reference.

In another embodiment, the slurry process is carried out continuously in a loop reactor. The catalyst, as a slurry in mineral oil or paraffinic hydrocarbon, or as a dry free flowing powder, is injected regularly to the reactor loop, which is itself filled with circulating slurry of growing polymer particles in a diluent containing monomer and comonomer. Hydrogen, optionally, may be added as a molecular weight control. The reactor is maintained at a pressure of 3620 kPa to 4309 kPa and at a temperature in the range of about 60° C. to about 115° C. depending on the desired polymer melting characteristics. Reaction heat is removed through the loop wall since much of the reactor is in the form of a double-jacketed pipe. The slurry is allowed to exit the reactor at regular intervals or continuously to a heated low pressure flash vessel, rotary dryer and a nitrogen purge column in sequence for removal of the diluent and all unreacted monomer and comonomers. The resulting hydrocarbon free powder is then compounded for use in various applications.

In another embodiment, the reactor used in the slurry process of the invention is capable of and the process of the invention is producing greater than 2000 lbs of polymer per hour (907 Kg/hr), more preferably greater than 5000 lbs/hr (2268 Kg/hr), and most preferably greater than 10,000 lbs/hr (4540 Kg/hr). In another embodiment the slurry reactor used in the process of the invention is producing greater than 15,000 lbs of polymer per hour (6804 Kg/hr), preferably greater than 25,000 lbs/hr (11,340 Kg/hr) to about 100,000 lbs/hr (45,500 Kg/hr).

In another embodiment in the slurry process of the invention the total reactor pressure is in the range of from 400 psig (2758 kPa) to 800 psig (5516 kPa), preferably 450 psig (3103 kPa) to about 700 psig (4827 kPa), more preferably 500 psig (3448 kPa) to about 650 psig (4482 kPa), most preferably from about 525 psig (3620 kPa) to 625 psig (4309 kPa).

In yet another embodiment in the slurry process of the invention the concentration of predominant monomer in the reactor liquid medium is in the range of from about 1 to 30 weight percent, preferably from about 2 to about 15 weight percent, more preferably from about 2.5 to about 10 weight percent, most preferably from about 3 to about 20 weight percent.

Another process of the invention is where the process, preferably a slurry or gas phase process is operated in the absence of or essentially free of any scavengers, such as triethylaluminum, trimethylaluminum, tri-isobutylaluminum and tri-n-hexylaluminum and diethyl aluminum chloride, dibutyl zinc and the like. This process is described in PCT publication WO 96/08520 and U.S. Pat. No. 5,712,352, which are herein fully incorporated by reference.

In another embodiment the process is run with scavengers. Typical scavengers include trimethyl aluminum, tri-ethyl aluminum, tri-isobutyl aluminum, tri-n-octyl aluminum, and an excess of alumoxane or modified alumoxane.

In some embodiments, the slurry phase polymerization operates in the absence of fluorocarbon. In some embodiments, the slurry phase polymerization is conducted in the presence of a fluorocarbon. Generally speaking the fluorocarbons may be used as polymerization media.

Solution Phase Polymerization

Solution phase polymerization is defined to be a polymerization system where the polymer produced is soluble in the polymerization medium. Generally this involves polymerization in a continuous reactor in which the polymer formed and the starting monomer and catalyst materials supplied, are agitated to reduce or avoid concentration gradients and in which the monomer acts as diluent or solvent or in which a hydrocarbon is used as a diluent or solvent. Suitable processes typically operate at temperatures from 0 to 250° C., preferably from 10 to 150° C., more preferably from 40 to 140, more preferably 50 to 120° C. and at pressures of 0.1 MPa or more, preferably 2 MPa or more. The upper pressure limit is not critically constrained but typically can be 200 MPa or less, preferably, 120 MPa or less. Temperature control in the reactor is generally obtained by balancing the heat of polymerization and with reactor cooling by reactor jackets or cooling coils to cool the contents of the reactor, auto refrigeration, pre-chilled feeds, vaporization of liquid medium (diluent, monomers or solvent) or combinations of all three. Adiabatic reactors with pre-chilled feeds may also be used. Preferably a fluorocarbon is added to the polymerization reactor as a pure component or a mixture with other fluorocarbon and/or hydrocarbon. The type and amount of fluorocarbon should be selected so that little or no precipitation of polymers produced occurs when a mixture of fluorocarbon and hydrocarbon is used. The type and amount of fluorocarbon also should to be optimized for the maximum catalyst productivity for a particular type of polymerization. The fluorocarbon can be also introduced as a catalyst carrier. The fluorocarbon can be introduced as a gas phase or as a liquid phase depending on the pressure and temperature. Advantageously, the fluorocarbon is kept in a liquid phase and introduced as a liquid. Fluorocarbon can be introduced in the feed to the polymerization reactors.

In a preferred embodiment, the polymerization process can be described as a continuous, non-batch process that, in its steady state operation, is exemplified by removal of amounts of polymer made per unit time, being substantially equal to the amount of polymer withdrawn from the reaction vessel per unit time. By "substantially equal" we intend that these amounts, polymer made per unit time, and polymer withdrawn per unit time, are in ratios of one to other, of from 0.9:1; or 0.95:1; or 0.97:1; or 1:1. In such a reactor, there will be a substantially homogeneous monomer distribution. At the same time, the polymerization is accomplished in substantially single step or stage or in a single reactor, contrasted to multistage or multiple reactors (two or more). These conditions preferably exist for substantially all of the time the copolymer is produced. In such a process the fluorocarbon is preferably injected into the reactor as the solvent or mixture of fluorocarbon and hydrocarbon.

Preferably in a continuous process, the mean residence time of the catalyst and polymer in the reactor generally is from 5 minutes to 8 hours, and preferably from 10 minutes to 6 hours, more preferably from ten minutes to one hour. In some embodiments, comonomer (such as ethylene) is added to the reaction vessel in an amount to maintain a differential pressure in excess of the combined vapor pressure of the main monomer (such as a propylene) and any optional diene monomers present.

In another embodiment, the polymerization process is carried out with a pressure of ethylene of from 10 to 1000 psi (68 to 6800 kPa), most preferably from 40 to 800 psi (272 to 5440 kPa). The polymerization is generally conducted at a temperature of from 25 to 250° C., preferably from 75 to 200° C., and most preferably from greater than 95 to 200° C.

In some embodiments, the solution phase polymerization operates in the absence of fluorocarbon. In some embodiments, the solution phase polymerization is conducted in the presence of a fluorocarbon. Generally speaking the fluorocarbons may be used as polymerization media and or as modifying agents. Addition of a small amount of hydrocarbon to a typical solution phase process will cause the polymer solution viscosity to drop and or the amount of polymer solute to increase. Addition of a larger amount of fluorocarbon to a traditional solution process will cause the separation of the polymer into a separate phase (which may be solid or liquid, depending on the reaction conditions, such as temperature or pressure).

The processes described herein can be carried out in continuous stirred tank reactors, batch reactors, or plug flow reactors. One reactor may be used even if sequential polymerizations are being performed, preferably as long as there is separation in time or space of the two reactions. Likewise two or more reactors operating in series or parallel may also be used. These reactors may have or may not have internal cooling and the monomer feed may or may not be refrigerated. See the general disclosure of U.S. Pat. No. 5,001,205 for general process conditions. See also, international application WO 96/33227 and WO 97/22639. As previously noted, the processes described above may optionally use more than one reactor. The use of a second reactor is especially useful in those embodiments in which an additional catalyst, especially a Ziegler-Natta or chrome catalyst, or by proper selection of process conditions, including catalyst selection, polymers with tailored properties can be produced. The cocatalysts and optional scavenger components in the process can be independently mixed with the catalyst component before introduction into the reactor, or they may each independently be fed into the reactor using separate streams, resulting in "in reactor" activation. Likewise, the fluorocarbons may be introduced into the reactor as a mixture with one or more catalyst system components or a scavenger. Each of the above processes may be employed in single reactor, parallel or series reactor configurations. In series operation, the second reactor temperature is preferably higher than the first reactor temperature. In parallel reactor operation, the temperatures of the two reactors are independent. The pressure can vary from about 1 mm Hg to 2500 bar (250 MPa), preferably from 0.1 bar to 1600 bar (0.01-160 MPa), most preferably from 1.0 to 500 bar (0.1-50 MPa). The liquid processes comprise contacting olefin monomers with the above described catalyst system in a suitable diluent or solvent and allowing said monomers to react for a sufficient time to produce the desired polymers. In multiple reactor processes the fluorocarbon may be introduced into one or all of the reactors. In particular, a fluorocarbon can be introduced into the first reactor, and a second fluorocarbon (which may be the same or different from the first fluorocarbon) may be introduced into the second reactor. Likewise the fluorocarbon may be introduced in the first reactor alone or the second reactor alone. In addition to the above, in multiple reactor configurations where there is a third, fourth or fifth reactor, the fluorocarbon may be introduced into all of the third, fourth and fifth reactors, none of the third, fourth and fifth reactors, just the third reactor, just the fourth reactor, just the fifth reactor, just the third and fourth reactors, just the third and fifth reactors, or just the fourth and fifth reactors.

Hydrocarbon fluids are suitable for use in the polymerizations of this invention as reaction media or parts of reaction media. Preferred hydrocarbons include aliphatic or aromatic hydrocarbon fluids including, for example, saturated hydrocarbons containing from 3 to 8 carbon atoms, such as propane, n-butane, isobutane, n-pentane, isopentane, neopentane, n-hexane, isohexane, cyclohexane and other saturated $C_6$ to $C_8$ hydrocarbons. Preferred hydrocarbon fluids include both aliphatic and aromatic fluids such as desulphurized light virgin naphtha and alkanes, such as propane, isobutane, mixed butanes, hexane, pentane, isopentane, cyclohexane, isooctane, and octane. Likewise one may also use mixtures of C3 to C20 paraffins and isoparaffins, preferably paraffinic/isoparrifinic mixtures of C4, C5 and or C6 alkanes.

Catalyst Components and Catalyst Systems

All polymerization catalysts including conventional-type transition metal catalysts are suitable for use in the polymerization process of the invention. The following is a non-limiting discussion of the various polymerization catalysts useful in the process of the invention.

Conventional-Type Transition Metal Catalysts

Conventional-type transition metal catalysts are those traditional Ziegler-Natta catalysts and Phillips-type chromium catalyst well known in the art. Examples of conventional-type transition metal catalysts are discussed in U.S. Pat. Nos. 4,115,639, 4,077,904 4,482,687, 4,564,605, 4,721,763, 4,879,359 and 4,960,741 all of which are herein fully incorporated by reference. The conventional-type transition metal catalyst compounds that may be used in the present invention include transition metal compounds from Groups 3 to 10, preferably 4 to 6 of the Periodic Table of Elements.

These conventional-type transition metal catalysts may be represented by the formula:

$$MR_x \quad (I)$$

where M is a metal from Groups 3 to 10, preferably Group 4, more preferably titanium; R is a halogen or a hydrocarbyloxy group; and x is the valence of the metal M, preferably x is 1, 2, 3 or 4, more preferably x is 4. Non-limiting examples of R include alkoxy, phenoxy, bromide, chloride and fluoride. Non-limiting examples of conventional-type transition metal catalysts where M is titanium include $TiCl_3$, $TiCl_4$, $TiBr_4$, $Ti(OC_2H_5)_3Cl$, $Ti(OC_2H_5)Cl_3$, $Ti(OC_4H_9)_3Cl$, $Ti(OC_3H_7)_2Cl_2$, $Ti(OC_2H_5)_2Br_2$, $TiCl_3.1/3AlCl_3$ and $Ti(OC_{12}H_{25})Cl_3$.

Conventional-type transition metal catalyst compounds based on magnesium/titanium electron-donor complexes that are useful in the invention are described in, for example, U.S. Pat. Nos. 4,302,565 and 4,302,566, which are herein fully incorporate by reference. The $MgTiCl_6$ (ethyl acetate)4 derivative is particularly preferred. British Patent Application 2,105,355, herein incorporated by reference, describes various conventional-type vanadium catalyst compounds. Non-limiting examples of conventional-type vanadium catalyst compounds include vanadyl trihalide, alkoxy halides and alkoxides such as $VOCl_3$, $VOCl_2(OBu)$ where Bu is butyl and $VO(OC_2H_5)_3$; vanadium tetra-halide and vanadium alkoxy halides such as $VCl_4$ and $VCl_3(OBu)$; vanadium and vanadyl acetyl acetonates and chloroacetyl acetonates such as $V(AcAc)_3$ and $VOCl_2(AcAc)$ where (AcAc) is an acetyl acetonate. The preferred conventional-type vanadium catalyst compounds are $VOCl_3$, $VCl_4$ and $VOCl_2$—OR where R is a hydrocarbon radical, preferably a $C_1$ to $C_{10}$ aliphatic or aromatic hydrocarbon radical such as ethyl, phenyl, isopropyl, butyl, propyl, n-butyl, iso-butyl, tertiary-butyl, hexyl, cyclohexyl, naphthyl, etc., and vanadium acetyl acetonates.

Conventional-type chromium catalyst compounds, often referred to as Phillips-type catalysts, suitable for use in the present invention include $CrO_3$, chromocene, silyl chromate, chromyl chloride ($CrO_2Cl_2$), chromium-2-ethyl-hexanoate, chromium acetylacetonate ($Cr(AcAc)_3$), and the like. Non-limiting examples are disclosed in U.S. Pat. Nos. 2,285,721, 3,242,099 and 3,231,550, which are herein fully incorporated by reference.

Still other conventional-type transition metal catalyst compounds and catalyst systems suitable for use in the present invention are disclosed in U.S. Pat. Nos. 4,124,532, 4,302, 565, 4,302,566 and 5,763,723 and published EP-A2 0 416 815 A2 and EP-A1 0 420 436, which are all herein incorporated by reference.

The conventional-type transition metal catalysts of the invention may also have the general formula:

$$M'_t M''X_2 Y_u E \quad (II)$$

where M' is Mg, Mn and/or Ca; t is a number from 0.5 to 2; M" is a transition metal such as Ti, V and/or Zr; X is a halogen, preferably Cl, Br or I; Y may be the same or different and is halogen, alone or in combination with oxygen, $-NR_2$, $-OR$, $-SR$, $-COOR$, or $-OSOOR$, where R is a hydrocarbyl radical, in particular an alkyl, aryl, cycloalkyl or arylalkyl radical, acetylacetonate anion in an amount that satisfies the valence state of M'; u is a number from 0.5 to 20; E is an electron donor compound selected from the following classes of compounds: (a) esters of organic carboxylic acids; (b) alcohols; (c) ethers; (d) amines; (e) esters of carbonic acid; (f) nitriles; (g) phosphoramides, (h) esters of phosphoric and phosphorus acid, and (j) phosphorus oxy-chloride. Non-limiting examples of complexes satisfying the above formula include: $MgTiCl_5.2CH_3COOC_2H_5$, $Mg_3Ti_2Cl_{12}.7CH_3COOC_2H_5$, $MgTiCl_5.6C_2H_5OH$, $MgTiCl_5.100CH_3OH$, $MgTCl_5.tetrahydrofuran$, $MgTi_2Cl_{12}.7C_6H_5CN$, $Mg_3Ti_2Cl_{12}.6C_6H_5COOC_2H_5$, $MgTiCl_6.2CH_3COOC_2H_5$, $MgTiCl_6.6C_5H_5N$, $MnTiCl_5.4C_2H_5OH$, $MgTiCl_5(OCH_3).2CH_3COOC_2H_5$, $MgTiCl_5N(C_6H_5)_2.3CH_3COOC_2H_5$, $MgTiBr_2Cl_4.2(C_2H_5)_2O$, $Mg_3V_2Cl_{12}.7CH_3$—$COOC_2H_5$, $MgZrCl_6.4$ tetrahydrofuran. Other catalysts may include cationic catalysts such as $AlCl_3$, and other cobalt and iron catalysts well known in the art.

Typically, these conventional-type transition metal catalyst compounds (excluding some conventional-type chromium catalyst compounds) are activated with one or more of the conventional-type cocatalysts described below.

Conventional-Type Cocatalysts

Conventional-type cocatalyst compounds for the above conventional-type transition metal catalyst compounds may be represented by the formula:

$$M^3 M^4{}_v X^2{}_c R^3{}_{b-c} \quad (III)$$

wherein $M^3$ is a metal from Group 1, 2, 12 and 13 of the Periodic Table of Elements; $M^4$ is a metal of Group IA of the Periodic Table of Elements; v is a number from 0 to 1; each $X^2$ is any halogen; c is a number from 0 to 3; each $R^3$ is a monovalent hydrocarbon radical or hydrogen; b is a number from 1 to 4; and wherein b minus c is at least 1.

Other conventional-type organometallic cocatalyst compounds for the above conventional-type transition metal catalysts have the formula:

$$M^3 R^3_k \qquad (IV)$$

where $M^3$ is a Group 1, 2, 12 or 13 metal, such as lithium, sodium, beryllium, barium, boron, aluminum, zinc, cadmium, and gallium; k equals 1, 2 or 3 depending upon the valency of $M^3$ which valency in turn normally depends upon the particular Group to which $M^3$ belongs; and each $R^3$ may be any monovalent hydrocarbon radical.

Non-limiting examples of conventional-type organometallic cocatalyst compounds of Groups 1, 2, 12 and 13 useful with the conventional-type catalyst compounds described above include methyllithium, butyllithium, dihexyhnercury, butylmagnesium, diethylcadmium, benzylpotassium, diethylzinc, tri-n-butylaluminum, diisobutyl ethylboron, diethylcadmium, di-n-butylzinc and tri-n-amylboron, and, in particular, the aluminum alkyls, such as tri-hexyl-aluminum, triethylaluminum, trimethylaluminum, and tri-isobutylaluminum. Other conventional-type cocatalyst compounds include mono-organohalides and hydrides of Group 2 metals, and mono- or di-organohalides and hydrides of Group 13 metals. Non-limiting examples of such conventional-type cocatalyst compounds include di-isobutylaluminum bromide, isobutylboron dichloride, methyl magnesium chloride, ethylberyllium chloride, ethylcalcium bromide, di-isobutylaluminum hydride, methylcadmium hydride, diethylboron hydride, hexylberyllium hydride, dipropylboron hydride, octylmagnesium hydride, butylzinc hydride, dichloroboron hydride, di-bromo-aluminum hydride and bromocadmium hydride. Conventional-type organometallic cocatalyst compounds are known to those in the art, and a more complete discussion of these compounds may be found in U.S. Pat. Nos. 3,221,002 and 5,093,415, which are herein fully incorporated by reference.

For purposes of this patent specification and appended claims conventional-type transition metal catalyst compounds exclude those bulky ligand metallocene-type catalyst compounds discussed below. For purposes of this patent specification and the appended claims the term "cocatalyst" refers to conventional-type cocatalysts or conventional-type organometallic cocatalyst compounds.

In some embodiment, however, it is preferred that the catalyst system not comprise titanium tetrachloride, particularly not the combination of $TiCl_4$ and aluminum alkyl (such as triethylaluminum), particularly when the FC is a perfluorocarbon. In situations where the catalyst is titanium tetrachloride, particularly the combination of $TiCl_4$ and aluminum alkyl (such as triethylaluminum) the FC is preferably a hydrofluorocarbon. In another embodiment, the catalyst is not a free radical initiator, such as a peroxide.

Bulky Ligand Metallocene-Type Catalyst Compounds

Generally, polymerization catalysts useful in the invention include one or more bulky ligand metallocene compounds (also referred to herein as metallocenes). Typical bulky ligand metallocene compounds are generally described as containing one or more bulky ligand(s) and one or more leaving group(s) bonded to at least one metal atom. The bulky ligands are generally represented by one or more open, acyclic, or fused ring(s) or ring system(s) or a combination thereof. These bulky ligands, preferably the ring(s) or ring system(s) are typically composed of atoms selected from Groups 13 to 16 atoms of the Periodic Table of Elements; preferably the atoms are selected from the group consisting of carbon, nitrogen, oxygen, silicon, sulfur, phosphorous, germanium, boron and aluminum or a combination thereof. Most preferably, the ring(s) or ring system(s) are composed of carbon atoms such as, but not limited to, those cyclopentadienyl ligands or cyclopentadienyl-type ligand structures or other similar functioning ligand structure such as a pentadiene, a cyclooctatetraendiyl or an imide ligand. The metal atom is preferably selected from Groups 3 through 15 and the lanthanide or actinide series of the Periodic Table of Elements. Preferably the metal is a transition metal from Groups 4 through 12, more preferably Groups 4, 5 and 6, and most preferably the transition metal is from Group 4.

Exemplary of these bulky ligand metallocene-type catalyst compounds and catalyst systems are described in for example, U.S. Pat. Nos. 4,530,914, 4,871,705, 4,937,299, 5,017,714, 5,055,438, 5,096, 867, 5,120,867, 5,124,418, 5,198,401, 5,210,352, 5,229,478, 5,264,405, 5,278,264, 5,278,119, 5,304,614, 5,324,800, 5,347,025, 5,350,723, 5,384,299, 5,391,790, 5,391,789, 5,399,636, 5,408,017, 5,491,207, 5,455,366, 5,534,473, 5,539,124, 5,554,775, 5,621,126, 5,684,098, 5,693,730, 5,698,634, 5,710,297, 5,712,354, 5,714,427, 5,714,555, 5,728,641, 5,728,839, 5,753,577, 5,767,209, 5,770,753 and 5,770,664 all of which are herein fully incorporated by reference. Also, the disclosures of European publications EP-A-0 591 756, EP-A-0 520 732, EP-A-0 420 436, EP-B1 0 485 822, EP-B1 0 485 823, EP-A2-0 743 324 and EP-B1 0 518 092 and PCT publications WO 91/04257, WO 92/00333, WO 93/08221, WO 93/08199, WO 94/01471, WO 96/20233, WO 97/15582, WO 97/19959, WO 97/46567, WO 98/01455, WO 98/06759 and WO 98/011144 are all herein fully incorporated by reference for purposes of describing typical bulky ligand metallocene-type catalyst compounds and catalyst systems.

In one embodiment, the catalyst composition of the invention includes one or more bulky ligand metallocene catalyst compounds represented by the formula:

$$L^A L^B MQ_n \qquad (V)$$

where M is a metal atom from the Periodic Table of the Elements and may be a Group 3 to 12 metal or from the lanthanide or actinide series of the Periodic Table of Elements, preferably M is a Group 4, 5 or 6 transition metal, more preferably M is a Group 4 transition metal, even more preferably M is zirconium, hafnium or titanium. The bulky ligands, $L^A$ and $L^B$, are open, acyclic or fused ring(s) or ring system(s) and are any ancillary ligand system, including unsubstituted or substituted, cyclopentadienyl ligands or cyclopentadienyl-type ligands, heteroatom substituted and/or heteroatom containing cyclopentadienyl-type ligands. Non-limiting examples of bulky ligands include cyclopentadienyl ligands, cyclopentaphenanthreneyl ligands, indenyl ligands, benzindenyl ligands, fluorenyl ligands, octahydrofluorenyl ligands, cyclooctatetraendiyl ligands, cyclopentacyclododecene ligands, azenyl ligands, azulene ligands, pentalene ligands, phosphoyl ligands, phosphinimine (WO 99/40125), pyrrolyl ligands, pyrozolyl ligands, carbazolyl ligands, borabenzene ligands and the like, including hydrogenated versions thereof, for example tetrahydroindenyl ligands. In one embodiment, $L^A$ and $L^B$ may be any other ligand structure capable of π-bonding to M. In yet another embodiment, the atomic molecular weight (MW) of $L^A$ or $L^B$ exceeds 60 a.m.u., preferably greater than 65 a.m.u. In another embodiment, $L^A$ and $L^B$ may comprise one or more heteroatoms, for example, nitrogen, silicon, boron, germanium, sulfur and phosphorous, in combination with carbon atoms to form an open, acyclic, or preferably a fused, ring or ring system, for example, a hetero-cyclopentadienyl ancillary ligand. Other $L^A$ and $L^B$ bulky ligands include but are not limited to bulky amides, phosphides, alkoxides, aryloxides, imides, carbolides, borollides, porphyrins, phthalocyanines, corrins and other polyazomacrocycles. Independently, each $L^A$ and $L^B$ may be the same or different type of bulky ligand that is bonded to M. In one embodiment of Formula III only one of either $L^A$ or $L^B$ is present.

Independently, each $L^A$ and $L^B$ may be unsubstituted or substituted with a combination of substituent groups R. Non-limiting examples of substituent groups R include one or more from the group selected from hydrogen, or linear, branched alkyl radicals, or alkenyl radicals, alkynyl radicals, cycloalkyl radicals or aryl radicals, acyl radicals, aroyl radicals, alkoxy radicals, aryloxy radicals, alkylthio radicals, dialkylamino radicals, alkoxycarbonyl radicals, aryloxycarbonyl radicals, carbomoyl radicals, alkyl- or dialkyl-carbamoyl radicals, acyloxy radicals, acylamino radicals, aroylamino radicals, straight, branched or cyclic, alkylene radicals, or combination thereof. In a preferred embodiment, substituent groups R have up to 50 non-hydrogen atoms, preferably from 1 to 30 carbon, that can also be substituted with halogens or heteroatoms or the like. Non-limiting examples of alkyl substituents R include methyl, ethyl, propyl, butyl, pentyl, hexyl, cyclopentyl, cyclohexyl, benzyl or phenyl groups and the like, including all their isomers, for example tertiary butyl, isopropyl, and the like. Other hydrocarbyl radicals include fluoromethyl, fluoroethyl, difluoroethyl, iodopropyl, bromohexyl, chlorobenzyl and hydrocarbyl substituted organometalloid radicals including trimethylsilyl, trimethylgermyl, methyldiethylsilyl and the like; and halocarbyl-substituted organometalloid radicals including tris (trifluoromethyl)silyl, methyl-bis(difluoromethyl)silyl, bromomethyldimethylgermyl and the like; and disubstitiuted boron radicals including dimethylboron for example; and disubstituted pnictogen radicals including dimethylamine, dimethylphosphine, diphenylamine, methylphenylphosphine, chalcogen radicals including methoxy, ethoxy, propoxy, phenoxy, methylsulfide and ethylsulfide. Non-hydrogen substituents R include the atoms carbon, silicon, boron, aluminum, nitrogen, phosphorous, oxygen, tin, sulfur, germanium and the like, including olefins such as but not limited to olefinically unsaturated substituents including vinyl-terminated ligands, for example but-3-enyl, prop-2-enyl, hex-5-enyl and the like. Also, at least two R groups, preferably two adjacent R groups, are joined to form a ring structure having from 3 to 30 atoms selected from carbon, nitrogen, oxygen, phosphorous, silicon, germanium, aluminum, boron or a combination thereof. Also, a substituent group R group such as 1-butanyl may form a carbon sigma bond to the metal M.

Other ligands may be bonded to the metal M, such as at least one leaving group Q. In one embodiment, Q is a monoanionic labile ligand having a sigma-bond to M. Depending on the oxidation state of the metal, the value for n is 0, 1 or 2 such that Formula V above represents a neutral bulky ligand metallocene catalyst compound.

Non-limiting examples of Q ligands include weak bases such as amines, phosphines, ethers, carboxylates, dienes, hydrocarbyl radicals having from 1 to 20 carbon atoms, hydrides or halogens and the like or a combination thereof. In another embodiment, two or more Q's form a part of a fused ring or ring system. Other examples of Q ligands include those substituents for R as described above and including cyclobutyl, cyclohexyl, heptyl, tolyl, trifluromethyl, tetramethylene, pentamethylene, methylidene, methyoxy, ethyoxy, propoxy, phenoxy, bis(N-methylanilide), dimethylamide, dimethylphosphide radicals and the like.

In another embodiment, the catalyst composition of the invention may include one or more bulky ligand metallocene catalyst compounds where $L^A$ and $L^B$ of Formula V are bridged to each other by at least one bridging group, A, as represented by:

$$L^A A L^B M Q_n \qquad (VI)$$

wherein $L^A$, $L^B$, M, Q and n are as defined above. These compounds of Formula VI are known as bridged, bulky ligand metallocene catalyst compounds. Non-limiting examples of bridging group A include bridging groups containing at least one Group 13 to 16 atom, often referred to as a divalent moiety such as but not limited to at least one of a carbon, oxygen, nitrogen, silicon, aluminum, boron, germanium and tin atom or a combination thereof. Preferably bridging group A contains a carbon, silicon or germanium atom, most preferably A contains at least one silicon atom or at least one carbon atom. The bridging group A may also contain substituent groups R as defined above including halogens and iron. Non-limiting examples of bridging group A may be represented by $R'_2C$, $R'_2Si$, $R'_2Si$ $R'_2Si$, $R'_2Ge$, R'P, where R' is independently, a radical group which is hydride, hydrocarbyl, substituted hydrocarbyl, halocarbyl, substituted halocarbyl, hydrocarbyl-substituted organometalloid, halocarbyl-substituted organometalloid, disubstituted boron, disubstituted pnictogen, substituted chalcogen, or halogen or two or more R' may be joined to form a ring or ring system. In one embodiment, the bridged, bulky ligand metallocene catalyst compounds of Formula VI have two or more bridging groups A (EP 664 301 B1).

In another embodiment, the bulky ligand metallocene catalyst compounds are those where the R substituents on the bulky ligands $L^A$ and $L^B$ of Formulas V and VI are substituted with the same or different number of substituents on each of the bulky ligands. In another embodiment, the bulky ligands $L^A$ and $L^B$ of Formulas V and VI are different from each other.

Other bulky ligand metallocene catalyst compounds and catalyst systems useful in the invention may include those described in U.S. Pat. Nos. 5,064,802, 5,145,819, 5,149,819, 5,243,001, 5,239,022, 5,276,208, 5,296,434, 5,321,106, 5,329,031, 5,304,614, 5,677,401, 5,723,398, 5,753,578, 5,854,363, 5,856,547 5,858,903, 5,859,158, 5,900,517 and 5,939,503 and PCT publications WO 93/08221, WO 93/08199, WO 95/07140, WO 98/11144, WO 98/41530, WO 98/41529, WO 98/46650, WO 99/02540 and WO 99/14221 and European publications EP-A-0 578 838, EP-A-0 638 595, EP-B-0 513 380, EP-A1-0 816 372, EP-A2-0 839 834, EP-B1-0 632 819, EP-B1-0 748 821 and EP-B1-0 757 996, all of which are herein fully incorporated by reference.

In another embodiment, the catalyst compositions of the invention may include bridged heteroatom, mono-bulky ligand metallocene compounds. These types of catalysts and catalyst systems are described in, for example, PCT publication WO 92/00333, WO 94/07928, WO 91/ 04257, WO 94/03506, WO96/00244, WO 97/15602 and WO 99/20637 and U.S. Pat. Nos. 5,057,475, 5,096,867, 5,055,438, 5,198, 401, 5,227,440 and 5,264,405 and European publication EP-A-0 420 436, all of which are herein fully incorporated by reference.

In another embodiment, the catalyst composition of the invention includes one or more bulky ligand metallocene catalyst compounds represented by Formula VII:

$$L^C AJMQ_n \quad (VII)$$

where M is a Group 3 to 16 metal atom or a metal selected from the Group of actinides and lanthanides of the Periodic Table of Elements, preferably M is a Group 4 to 12 transition metal, and more preferably M is a Group 4, 5 or 6 transition metal, and most preferably M is a Group 4 transition metal in any oxidation state, especially titanium; $L^C$ is a substituted or unsubstituted bulky ligand bonded to M; J is bonded to M; A is bonded to J and $L^C$; J is a heteroatom ancillary ligand; and A is a bridging group; Q is a univalent anionic ligand; and n is the integer 0,1 or 2. In Formula VII above, $L^C$, A and J form a fused ring system. In an embodiment, $L^C$ of Formula V is as defined above for $L^A$, A, M and Q of Formula VII are as defined above in Formula V.

In Formula VII, J is a heteroatom containing ligand in which J is an element with a coordination number of three from Group 15 or an element with a coordination number of two from Group 16 of the Periodic Table of Elements. Preferably J contains a nitrogen, phosphorus, oxygen or sulfur atom with nitrogen being most preferred. In a preferred embodiment, when the catalyst system comprises compounds represented by Formula VII, the FC preferably is a hydrofluorocarbon. Preferably, when the catalyst system comprises compounds represented by Formula VII, the FC is not a perfluorocarbon.

In an embodiment of the invention, the bulky ligand metallocene catalyst compounds are heterocyclic ligand complexes where the bulky ligands, the ring(s) or ring system(s), include one or more heteroatoms or a combination thereof. Non-limiting examples of heteroatoms include a Group 13 to 16 element, preferably nitrogen, boron, sulfur, oxygen, aluminum, silicon, phosphorous and tin. Examples of these bulky ligand metallocene catalyst compounds are described in WO 96/33202, WO 96/34021, WO 97/17379 and WO 98/22486 and EP-A1-0 874 005 and U.S. Pat. Nos. 5,637,660, 5,539,124, 5,554,775, 5,756,611, 5,233,049, 5,744,417, and 5,856,258 all of which are herein incorporated by reference.

In one embodiment, the bulky ligand metallocene catalyst compounds are those complexes known as transition metal catalysts based on bidentate ligands containing pyridine or quinoline moieties, such as those described in U.S. application Ser. No. 09/103,620 filed Jun. 23, 1998, which is herein incorporated by reference. In another embodiment, the bulky ligand metallocene catalyst compounds are those described in PCT publications WO 99/01481 and WO 98/42664, which are fully incorporated herein by reference.

In another embodiment, the bulky ligand metallocene catalyst compound is a complex of a metal, preferably a transition metal, a bulky ligand, preferably a substituted or unsubstituted pi-bonded ligand, and one or more heteroallyl moieties, such as those described in U.S. Pat. Nos. 5,527,752 and 5,747,406 and EP-B 1-0 735 057, all of which are herein fully incorporated by reference.

In another embodiment, the catalyst composition of the invention includes one or more bulky ligand metallocene catalyst compounds is represented by Formula VIII:

$$L^D MQ_2(YZ)X_n \quad (VIII)$$

where M is a Group 3 to 16 metal, preferably a Group 4 to 12 transition metal, and most preferably a Group 4, 5 or 6 transition metal; $L^D$ is a bulky ligand that is bonded to M; each Q is independently bonded to M and $Q_2(YZ)$ forms a ligand, preferably a unicharged polydentate ligand; or Q is a univalent anionic ligand also bonded to M; X is a univalent anionic group when n is 2 or X is a divalent anionic group when n is 1; n is 1 or 2.

In Formula VIII, L and M are as defined above for Formula V. Q is as defined above for Formula V, preferably Q is selected from the group consisting of —O—, —NR—, —CR2- and —S—; Y is either C or S; Z is selected from the group consisting of —OR, —NR2, —CR3, —SR, —SiR3, —PR2, —H, and substituted or unsubstituted aryl groups, with the proviso that when Q is —NR— then Z is selected from one of the group consisting of —OR, —NR2, —SR, —SiR3, —PR2 and —H; R is selected from a group containing carbon, silicon, nitrogen, oxygen, and/or phosphorus, preferably where R is a hydrocarbon group containing from 1 to 20 carbon atoms, most preferably an alkyl, cycloalkyl, or an aryl group; n is an integer from 1 to 4, preferably 1 or 2; X is a univalent anionic group when n is 2 or X is a divalent anionic group when n is 1; preferably X is a carbamate, carboxylate, or other heteroallyl moiety described by the Q, Y and Z combination.

Still other useful catalysts include those multinuclear metallocene catalysts as described in WO 99/20665 and 6,010,794, and transition metal metaaracyle structures described in EP 0 969 101 A2, which are herein incorporated herein by reference. Other metallocene catalysts include those described in EP 0 950 667 A1, double cross-linked metallocene catalysts (EP 0 970 074 A1), tethered metallocenes (EP 970 963 A2) and those sulfonyl catalysts described in U.S. Pat. No. 6,008,394, which are incorporated herein by reference.

It is also contemplated that in one embodiment the bulky ligand metallocene catalysts, described above, include their structural or optical or enantiomeric isomers (meso and racemic isomers, for example see U.S. Pat. No. 5,852,143, incorporated herein by reference) and mixtures thereof.

In another embodiment, the bulky ligand type metallocene-type catalyst compound is a complex of a transition metal, a substituted or unsubstituted pi-bonded ligand, and one or more heteroallyl moieties, such as those described in U.S. Pat. Nos. 5,527,752 and 5,747,406 and EP-B1-0 735 057, all of which are herein fully incorporated by reference.

The catalyst compositions of the invention may include one or more complexes known as transition metal catalysts based on bidentate ligands containing pyridine or quinoline moieties, such as those described in U.S. Pat. No. 6,103,657, which is herein incorporated by reference.

In one embodiment, these catalyst compounds are represented by the formula:

$$((Z)XA_t(YJ))_q MQ_n \quad (IX)$$

where M is a metal selected from Group 3 to 13 or lanthanide and actinide series of the Periodic Table of Elements; Q is bonded to M and each Q is a monovalent, bivalent, or trivalent anion; X and Y are bonded to M; one or more of X and Y are heteroatoms, preferably both X and Y are heteroatoms; Y is contained in a heterocyclic ring J, where J comprises from 2 to 50 non-hydrogen atoms, preferably 2 to 30 carbon atoms; Z is bonded to X, where Z comprises 1 to 50 non-hydrogen atoms, preferably 1 to 50 carbon atoms, preferably Z is a cyclic group containing 3 to 50 atoms, preferably 3 to 30 carbon atoms; t is 0 or 1; when t is 1, A is a bridging group joined to at least one of X, Y or J, preferably X and J; q is 1 or 2; n is an integer from 1 to 4 depending on the oxidation state of M. In one embodiment, where X is oxygen or sulfur then Z is optional.

In another embodiment, where X is nitrogen or phosphorous then Z is present. In an embodiment, Z is preferably an aryl group, more preferably a substituted aryl group.

In another embodiment of the invention the bulky ligand metallocene-type catalyst compounds are those nitrogen containing heterocyclic ligand complexes, also known as transition metal catalysts based on bidentate ligands containing pyridine or quinoline moieties, such as those described in WO 96/33202, WO 99/01481 and WO 98/42664 and U.S. Pat. No. 5,637,660, which are herein all incorporated by reference.

It is within the scope of this invention, in one embodiment, the catalyst compounds include complexes of $Ni^{2+}$ and $Pd^{2+}$ described in the articles Johnson, et al., "New Pd(I)- and Ni(II)-Based Catalysts for Polymerization of Ethylene and a-Olefins", J. Am. Chem. Soc. 1995, 117, 6414-6415 and Johnson, et al., "Copolynmerization of Ethylene and Proplene with Functionalized Vinyl Monomers by Palladium (II) Catalysts", J. Am. Chem. Soc. 1996, 118, 267-268, and WO 96/23010 published Aug. 1, 1996 WO 99/02472, U.S. Pat. Nos. 5,852,145, 5,866,663 and 5,880,241, which are all herein fully incorporated by reference. These complexes can be either dialkyl ether adducts, or alkylated reaction products of the described dihalide complexes that can be activated to a cationic state by the activators of this invention described below.

Also included as bulky ligand metallocene-type catalyst compounds useful herein are those diimine based ligands for Group 8 to 10 metal compounds disclosed in PCT publications WO 96/23010 and WO 97/48735 and Gibson, et. al., Chem. Comm., pp. 849-850 (1998), all of which are herein incorporated by reference.

Other bulky ligand metallocene-type catalysts useful herein are those Group 5 and 6 metal imido complexes described in EP-A2-0 816 384 and U.S. Pat. No. 5,851,945, which is incorporated herein by reference. In addition, bulky ligand metallocene-type catalysts useful herein include bridged bis(arylamido) Group 4 compounds described by D. H. McConville, et al., in Organometallics 1195, 14, 5478-5480, which is herein incorporated by reference. Other bulky ligand metallocene-type catalysts useful herein are described as bis(hydroxy aromatic nitrogen ligands) in U.S. Pat. No. 5,852,146, which is incorporated herein by reference. Other metallocene-type catalysts containing one or more Group 15 atoms useful herein include those described in WO 98/46651, which is herein incorporated herein by reference. Still another metallocene-type bulky ligand metallocene-type catalysts useful herein include those multinuclear bulky ligand metallocene-type catalysts as described in WO 99/20665, which is incorporated herein by reference. In addition, useful Group 6 bulky ligand metallocene catalyst systems are described in U.S. Pat. No. 5,942,462, which is incorporated herein by reference.

It is contemplated in some embodiments, that the bulky ligands of the metallocene-type catalyst compounds of the invention described above may be asymmetrically substituted in terms of additional substituents or types of substituents, and/or unbalanced in terms of the number of additional substituents on the bulky ligands or the bulky ligands themselves are different.

It is also contemplated that in one embodiment, the bulky ligand metallocene-type catalysts of the invention include their structural or optical or enantiomeric isomers (meso and racemic isomers) and mixtures thereof. In another embodiment the bulky ligand metallocene-type compounds useful in the invention may be chiral and/or a bridged bulky ligand metallocene-type catalyst compound.

Preferred metallocene catalysts are those in the generic class of bridged, substituted bis(cyclopentadienyl) metallocenes, specifically bridged, substituted bis(indenyl) metallocenes known to produce high molecular weight, high melting, highly isotactic propylene polymers. Generally speaking, those of the generic class disclosed in U.S. Pat. No. 5,770,753 (fully incorporated herein by reference) should be suitable, however, the specific polymer obtained is typically dependent on the metallocene's specific substitution pattern. Particularly preferred are racemic metallocenes, such as rac-dimethylsiladiyl(2-isopropyl,4-phenylindenyl)$_2$ zirconium dichloride; rac-dimethylsiladiyl(2-isopropyl,4-[1-naphthyl]indenyl)$_2$ zirconium dichloride; rac-dimethylsiladiyl(2-isopropyl,4-[3,5-dimethylphenyl]indenyl)$_2$ zirconium dichloride; rac-dimethylsiladiyl(2-isopropyl,4-[ortho-methylphenyl]indenyl)$_2$ zirconium dichloride; rac dimethylsiladlyl bis-(2-methyl, 4-napthyl indenyl)zirconium dichloride, rac-dimethyl siladiyl(2-isopropyl, 4-[3,5 di-t-butyl-phenyl]indenyl)$_2$ zirconium dichloride; rac-dimethyl siladiyl(2-isopropyl, 4-[orthophenyl-phenyl]indenyl)$_2$ zirconium dichloride, rac-diphenylsiladiyl(2-methyl-4-[1-naphthyl]indenyl)$_2$ zirconium dichloride and rac-biphenyl siladiyl(2-isopropyl, 4-[3,5 di-t-butyl-phenyl]indenyl)$_2$ zirconium dichloride. Alkylated variants of these metallocenes (e.g. di-methyl instead of dichloride) are also contemplated, and are typically used in combination with non-coordinating anion type activators. These and other metallocene compositions are described in detail in U.S. Pat. Nos. 6,376,407, 6,376,408, 6,376,409, 6,376,410, 6,376,411, 6,376,412, 6,376,413, 6,376,627, 6,380,120, 6,380,121, 6,380,122, 6,380,123, 6,380,124, 6,380,330, 6,380,331, 6,380,334, 6,399,723 and 6,825,372.

Mixed Catalysts

It is also within the scope of this invention that the above described bulky ligand metallocene-type catalyst compounds can be combined with one or more of the conventional-type transition metal catalysts compounds with one or more co-catalysts or activators or activation methods described above. For example, see U.S. Pat. Nos. 4,937,299, 4,935,474, 5,281,679, 5,359,015, 5,470,811, and 5,719,241 all of which are herein fully incorporated herein reference.

In another embodiment of the invention one or more bulky ligand metallocene-type catalyst compounds or catalyst systems may be used in combination with one or more conventional-type catalyst compounds or catalyst systems. Non-limiting examples of mixed catalysts and catalyst systems are described in U.S. Pat. Nos. 4,159,965, 4,325,837, 4,701,432, 5,124,418, 5,077,255, 5,183,867, 5,391,660, 5,395,810, 5,691,264, 5,723,399 and 5,767,031 and PCT Publication WO 96/23010 published Aug. 1, 1996, all of which are herein fully incorporated by reference.

It is further contemplated that two or more conventional-type transition metal catalysts may be combined with one or more conventional-type cocatalysts. Non-limiting examples of mixed conventional-type transition metal catalysts are described in for example U.S. Pat. Nos. 4,154,701, 4,210,559, 4,263,422, 4,672,096, 4,918,038, 5,198,400, 5,237,025, 5,408,015 and 5,420,090, all of which are herein incorporated by reference.

Activator and Activation Methods

The above described polymerization catalyst, particularly bulky ligand metallocene-type catalyst compounds, are typically activated in various ways to yield catalyst compounds having a vacant coordination site that will coordinate, insert, and polymerize olefin(s).

For the purposes of this invention, the term "activator" is defined to be any compound which can activate any one of the catalyst compounds described herein by converting the neutral catalyst compound to a catalytically active catalyst cation compound. Non-limiting activators, for example, include alumoxanes, aluminum alkyls, ionizing activators, which may be neutral or ionic, and conventional-type cocatalysts.

Alumoxanes

In one embodiment, alumoxane activators are utilized as an activator in the catalyst composition of the invention. Alumoxanes are generally oligomeric compounds containing —Al(R)—O— subunits, where R is an alkyl group. Non-limiting examples of alumoxanes include methylalumoxane (MAO), modified methylalumoxane (MMAO), ethylalumoxane and isobutylalumoxane. Alumoxanes may be produced by the hydrolysis of the respective trialkylaluminum compound. MMAO may be produced by the hydrolysis of trimethylaluminum and a higher trialkylaluminum such as triisobutylaluminum. MMAO's are generally more soluble in aliphatic solvents and more stable during storage. There are a variety of methods for preparing alumoxane and modified alumoxanes, non-limiting examples of which are described in U.S. Pat. Nos. 4,665,208, 4,952,540, 5,091,352, 5,206,199, 5,204,419, 4,874,734, 4,924,018, 4,908,463, 4,968,827, 5,308,815, 5,329,032, 5,248,801, 5,235,081, 5,157,137, 5,103,031, 5,391,793, 5,391,529, 5,693,838, 5,731,253, 5,731,451, 5,744,656, 5,847,177, 5,854,166, 5,856,256 and 5,939,346 and European publications EP-A-0 561 476, EP-B1-0 279 586, EP-A-0 594-218 and EP-B1-0 586 665, and PCT publications WO 94/10180 and WO 99/15534, all of which are herein fully incorporated by reference. Another alumoxane is a modified methyl alumoxane (MMAO) cocatalyst type 3A (commercially available from Akzo Chemicals, Inc. under the trade name Modified Methylalumoxane type 3A, covered under patent number US 5,041,584). Aluminum Alkyl or organoaluminum compounds which may be utilized as activators include trimethylaluminum, triethylaluminum, triisobutylaluminum, tri-n-hexylaluminum, tri-n-octylaluminum and the like.

Ionizing Activators

It is within the scope of this invention to use an ionizing or stoichiometric activator, neutral or ionic, such as tri(n-butyl) ammonium tetrakis(pentafluorophenyl)boron, a trisperfluorophenyl boron metalloid precursor or a trisperfluoronaphtyl boron metalloid precursor, polyhalogenated heteroborane anions (WO 98/43983), boric acid (U.S. Pat. No. 5,942,459) or combination thereof. It is also within the scope of this invention to use neutral or ionic activators alone or in combination with alumoxane or modified alumoxane activators.

Non-limiting examples of neutral stoichiometric activators include tri-substituted boron, tellurium, aluminum, gallium and indium or mixtures thereof. The three substituent groups are each independently selected from alkyls, alkenyls, halogen, substituted alkyls, aryls, arylhalides, alkoxy and halides. Preferably, the three groups are independently selected from halogen, mono or multicyclic (including halosubstituted) aryls, alkyls, and alkenyl compounds and mixtures thereof, preferred are alkenyl groups having 1 to 20 carbon atoms, alkyl groups having 1 to 20 carbon atoms, alkoxy groups having 1 to 20 carbon atoms and aryl groups having 3 to 20 carbon atoms (including substituted aryls). More preferably, the three groups are alkyls having 1 to 4 carbon groups, phenyl, napthyl or mixtures thereof. Even more preferably, the three groups are halogenated, preferably fluorinated, aryl groups. Most preferably, the neutral stoichiometric activator is trisperfluorophenyl boron or trisperfluoronapthyl boron.

"Substituted alkyl" refers to an alkyl as described in which one or more hydrogen atoms of the alkyl is replaced by another group such as a halogen, aryl, substituted aryl, cycloalkyl, substituted cycloalkyl, and combinations thereof. Examples of substituted alkyls include, for example, benzyl, trifluoromethyl and the like.

Ionic stoichiometric activator compounds may contain an active proton, or some other cation associated with, but not coordinated to, or only loosely coordinated to, the remaining ion of the ionizing compound. Such compounds and the like are described in European publications EP-A-0 570 982, EP-A-0 520 732, EP-A-0 495 375, EP-B1-0 500 944, EP-A-0 277 003 and EP-A-0 277 004, and U.S. Pat. Nos. 5,153,157, 5,198,401, 5,066,741, 5,206,197, 5,241,025, 5,384,299 and 5,502,124 and U.S. patent application Ser. No. 08/285,380, filed Aug. 3, 1994, all of which are herein fully incorporated by reference.

In a preferred embodiment, the stoichiometric activators include a cation and an anion component, and may be represented by the following formula:

$$(L-H)_d^+ \cdot (A^{d-}) \qquad (X)$$

wherein: L is an neutral Lewis base; H is hydrogen; $(L-H)^+$ is a Bronsted acid; $A^{d-}$ is a non-coordinating anion having the charge d-; and d is an integer from 1 to 3. The cation component, $(L-H)_d^+$ may include Bronsted acids such as protons or protonated Lewis bases or reducible Catalysts capable of protonating or abstracting a moiety, such as an akyl or aryl, from the bulky ligand metallocene or Group 15 containing transition metal catalyst precursor, resulting in a cationic transition metal species.

The activating cation $(L-H)_d^+$ may be a Bronsted acid, capable of donating a proton to the transition metal catalytic precursor resulting in a transition metal cation, including ammoniums, oxoniums, phosphoniums, silyliums and mixtures thereof, preferably ammoniums of methylamine, aniline, dimethylamine, diethylamine, N-methylaniline, diphenylamine, trimethylamine, triethylamine, N,N-dimethylaniline, methyldiphenylamine, pyridine, p-bromo N,N-dimethylaniline, p-nitro-N,N-dimethylaniline, phosphoniums from triethylphosphine, triphenylphosphine, and diphenylphosphine, oxomiuns from ethers such as dimethyl ether diethyl ether, tetrahydrofuran and dioxane, sulfoniums from thioethers, such as diethyl thioethers and tetrahydrothiophene and mixtures thereof. The activating cation $(L-H)_d^+$ may also be an abstracting moiety such as silver, carboniums, tropylium, carbeniums, ferroceniums and mixtures, preferably carboniums and ferroceniums. Most preferably $(L-H)_d^+$ is triphenyl carbonium.

The anion component $A^{d-}$ includes those having the formula $[M^{k+}Q_n]^{d-}$ wherein k is an integer from 1 to 3; n is an integer from 2-6; n-k=d; M is an element selected from Group 13 of the Periodic Table of the Elements, preferably boron or aluminum, and Q is independently a hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, said Q having up to 20 carbon atoms with the proviso that in not more than 1 occurrence is Q a halide. Preferably, each Q is a fluorinated hydrocarbyl group having 1 to 20 carbon atoms, more preferably each Q is a fluorinated aryl group, and most preferably each Q is a pentafluoryl aryl group. Examples of suitable $A^{d-}$ also include diboron compounds as disclosed in U.S. Pat. No. 5,447,895, which is fully incorporated herein by reference.

Most preferably, the ionic stoichiometric activator $(L-H)_d^+ \cdot (A^{d-})$ is N,N-dimethylanilinium tetra(perfluorophenyl)borate or triphenylcarbenium tetra(perfluorophenyl)borate.

In one embodiment, an activation method using ionizing ionic compounds not containing an active proton but capable of producing a bulky ligand metallocene catalyst cation and their non-coordinating anion are also contemplated, and are described in EP-A-0 426 637, EP-A-0 573 403 and U.S. Pat. No. 5,387,568, which are all herein incorporated by reference.

Additional Activators

Other activators include those described in PCT publication WO 98/07515 such as tris(2,2',2"-nonafluorobiphenyl)fluoroaluminate, which publication is fully incorporated herein by reference. Combinations of activators are also contemplated by the invention, for example, alumoxanes and ionizing activators in combinations, see for example, EP-B1 0 573 120, PCT publications WO 94/07928 and WO 95/14044 and U.S. Pat. Nos. 5,153,157 and 5,453,410 all of which are herein fully incorporated by reference.

Other suitable activators are disclosed in WO 98/09996, incorporated herein by reference, which describes activating bulky ligand metallocene catalyst compounds with perchlorates, periodates and iodates including their hydrates. WO 98/30602 and WO 98/30603, incorporated by reference, describe the use of lithium (2,2'-bisphenyl-ditrimethylsilicate).4THF as an activator for a bulky ligand metallocene catalyst compound. WO 99/18135, incorporated herein by reference, describes the use of organo-boron-aluminum activators. EP-B1-0 781 299 describes using a silylium salt in combination with a non-coordinating compatible anion. Also, methods of activation such as using radiation (see EP-B1-0 615 981 herein incorporated by reference), electrochemical oxidation, and the like are also contemplated as activating methods for the purposes of rendering the neutral bulky ligand metallocene catalyst compound or precursor to a bulky ligand metallocene cation capable of polymerizing olefins.

Other activators or methods for activating a bulky ligand metallocene catalyst compound are described in for example, U.S. Pat. Nos. 5,849,852, 5,859,653 and 5,869,723 and WO 98/32775, WO 99/42467 (dioctadecylmethylammonium-bis(tris(pentafluorophenyl)borane)benzimidazolide), which are herein incorporated by reference.

Another suitable ion forming, activating cocatalyst comprises a salt of a cationic oxidizing agent and a noncoordinating, compatible anion represented by the formula:

$$(OX^{e+})_d (A^{d-})_e \qquad \text{(XII)}$$

wherein: $OX^{e+}$ is a cationic oxidizing agent having a charge of e+; e is an integer from 1 to 3; and $A^-$, and d are as previously defined above. Non-limiting examples of cationic oxidizing agents include: ferrocenium, hydrocarbyl-substituted ferrocenium, $Ag^+$, or $Pb^{+2}$. Preferred embodiments of $A^{d-}$ are those anions previously defined with respect to the Bronsted acid containing activators, especially tetrakis(pentafluorophenyl)borate.

It within the scope of this invention that catalyst compounds can be combined one or more activators or activation methods described above. For example, a combination of activators have been described in U.S. Pat. Nos. 5,153,157 and 5,453,410, European publication EP-B1 0 573 120, and PCT publications WO 94/07928 and WO 95/14044. These documents all discuss the use of an alumoxane and an ionizing activator with a bulky ligand metallocene catalyst compound. In a preferred embodiment, the catalyst systems of this invention are not present on a support.

A preferred catalyst compound for use in this invention is dimethylsilyl t-butyl-amido tetramethylcyclopentadienyl titanium dichloride, preferably activated with a noncoordinating anion such as dimethylaniliniumtetrakis(pentafluorophenyl)borate.

Monomers

Polymers produced according to this invention are olefin polymers or "polyolefins". By olefin polymers is meant that at least 75 mole % of the polymer is made of hydrocarbon monomers, preferably at least 80 mole %, preferably at least 85 mole %, preferably at least 90 mole %, preferably at least 95 mole %, preferably at least 99 mole %. In a particularly preferred embodiment, the polymers are 100 mole % hydrocarbon monomer. Hydrocarbon monomers are monomers made up of only carbon and hydrogen. In another embodiment of the invention up to 25 mol % of the polyolefin is derived from heteroatom containing monomers. Heteroatom containing monomers are hydrocarbon monomers where one or more hydrogen atoms have been replaced by a heteroatom. In a preferred embodiment, the heteroatom is selected from the group consisting of chlorine, bromine, oxygen, nitrogen, silicon and sulfur, preferably the heteroatom is selected from the group consisting of oxygen, nitrogen, silicon and sulfur, preferably the heteroatom is selected from the group consisting of oxygen and nitrogen, preferably oxygen. In a preferred embodiment, the heteroatom is not fluorine. In another embodiment of the invention, the monomers to be polymerized are not fluormonomers. Fluoromonomers are defined to be hydrocarbon monomers where at least one hydrogen atom has been replaced by a fluorine atom. In another embodiment of the invention, the monomers to be polymerized are not halomonomers. (By halomonomer is meant a hydrocarbon monomer where at least one hydrogen atom is replaced by a halogen.) In another embodiment of the invention, the monomers to be polymerized are not vinyl aromatic hydrocarbons. In another embodiment of the invention, the monomers to be polymerized are preferably aliphatic or alicyclic hydrocarbons (as defined under "Hydrocarbon" in Hawley's Condensed Chemical Dictionary, 13th edition, R. J. Lewis ed., John Wiley and Sons, New York, 1997). In another embodiment of the invention, the monomers to be polymerized are preferably linear or branched alpha-olefins, preferably C2 to C40 linear or branched alpha-olefins, preferably C2 to C20 linear or branched alpha-olefins, preferably ethylene, propylene, butene, pentene, hexene, heptene, octene, nonene, decene, undecene, dodecene, or mixtures thereof, more preferably ethylene, propylene, butene hexene and octene.

In a preferred embodiment the processes of this invention are used to polymerize any unsaturated monomer or monomers. Preferred monomers include $C_2$ to $C_{100}$ olefins, preferably $C_2$ to $C_{60}$ olefins, preferably $C_2$ to $C_{40}$ olefins preferably $C_2$ to $C_{20}$ olefins, preferably $C_2$ to $C_{12}$ olefins. In some embodiments preferred monomers include linear, branched or cyclic alpha-olefins, preferably $C_2$ to $C_{100}$ alpha-olefins, preferably $C_2$ to $C_{60}$ alpha-olefins, preferably $C_2$ to $C_{40}$ alpha-olefins preferably $C_2$ to $C_{20}$ alpha-olefins, preferably $C_2$ to $C_{12}$ alpha-olefins. Preferred olefin monomers may be one or more of ethylene, propylene, butene, pentene, hexene, heptene, octene, nonene, decene, dodecene, 4-methylpentene-1, 3-methylpentene-1,3,5,5-trimethylhexene-1, and 5-ethylnonene-1.

In another embodiment the polymer produced herein is a copolymer of one or more linear or branched $C_3$ to $C_{30}$ prochiral alpha-olefins or $C_5$ to $C_{30}$ ring containing olefins or combinations thereof capable of being polymerized by either stereospecific and non-stereospecific catalysts. Prochiral, as used herein, refers to monomers that favor the formation of isotactic or syndiotactic polymer when polymerized using stereospecific catalyst(s).

Preferred monomers may also include aromatic-group-containing monomers containing up to 30 carbon atoms. Suitable aromatic-group-containing monomers comprise at least one aromatic structure, preferably from one to three, more preferably a phenyl, indenyl, fluorenyl, or naphthyl moiety. The aromatic-group-containing monomer further comprises at least one polymerizable double bond such that after polymerization, the aromatic structure will be pendant from the polymer backbone. The aromatic-group containing monomer may further be substituted with one or more hydrocarbyl groups including but not limited to $C_1$ to $C_{10}$ alkyl groups. Additionally two adjacent substitutions may be joined to form a ring structure. Preferred aromatic-group-containing monomers contain at least one aromatic structure appended to a polymerizable olefinic moiety. Particularly preferred aromatic monomers include styrene, alpha-methylstyrene, para-alkylstyrenes, vinyltoluenes, vinylnaphthalene, allyl benzene, and indene, especially styrene, para-methylstyrene, 4-phenyl-1-butene and allyl benzene.

Non aromatic cyclic group containing monomers are also preferred. These monomers can contain up to 30 carbon atoms. Suitable non-aromatic cyclic group containing monomers preferably have at least one polymerizable olefinic group that is either pendant on the cyclic structure or is part of the cyclic structure. The cyclic structure may also be further substituted by one or more hydrocarbyl groups such as, but not limited to, $C_1$ to $C_{10}$ alkyl groups. Preferred non-aromatic cyclic group containing monomers include vinylcyclohexane, vinylcyclohexene, cyclopentadiene, cyclopentene, 4-methylcyclopentene, cyclohexene, 4-methylcyclohexene, cyclobutene, vinyladamantane, norbornene, 5-methylnorbornene, 5-ethylnorbornene, 5-propylnorbornene, 5-butylylnorbornene, 5-pentylnorbornene, 5-hexylnorbornene, 5-heptylnorbornene, 5-octylnorbornene, 5-nonylnorbornene, 5-decylnorbornene, 5-phenylnorbornene, vinylnorbornene, ethylidene norbornene, 5,6-dimethylnorbornene, 5,6-dibutylnorbornene and the like.

Preferred diolefin monomers useful in this invention include any hydrocarbon structure, preferably $C_4$ to $C_{30}$, having at least two unsaturated bonds, wherein at least one, typically two, of the unsaturated bonds are readily incorporated into a polymer by either a stereospecific or a non-stereospecific catalyst(s). It is further preferred that the diolefin monomers be selected from alpha-omega-diene monomers (i.e. di-vinyl monomers). More preferably, the diolefin monomers are linear di-vinyl monomers, most preferably those containing from 4 to 30 carbon atoms. Examples of preferred dienes include butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, particularly preferred dienes include 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and low molecular weight polybutadienes (Mw less than 1000 g/mol). Preferred cyclic dienes include cyclopentadiene, vinylnorbornene, norbomadiene, ethylidene norbornene, divinylbenzene, dicyclopentadiene or higher ring containing diolefins with or without substituents at various ring positions. Preferred dienes include both cis and trans 1,4-hexadiene.

Non-limiting examples of preferred polar unsaturated monomers useful in this invention include nitro substituted monomers including 6-nitro-1-hexene; amine substituted monomers including N-methylallylamine, N-allylcyclopentylamine, and N-allyl-hexylamine; ketone substituted monomers including methyl vinyl ketone, ethyl vinyl ketone, and 5-hexen-2-one; aldehyde substituted monomers including acrolein, 2,2-dimethyl-4-pentenal, undecylenic aldehyde, and 2,4-dimethyl-2,6-heptadienal; alcohol substituted monomers including allyl alcohol, 7-octen-1-ol, 7-octene-1,2-diol, 10-undecen-1-ol, 10-undecene-1,2-diol, 2-methyl-3-buten-1-ol; acetal, epoxide and or ether substituted monomers including 4-hex-5-enyl-2,2-dimethyl-[1,3]dioxolane, 2,2-dimethyl-4-non-8-enyl-[1,3]dioxolane, acrolein dimethyl acetal, butadiene monoxide, 1,2-epoxy-7-octene, 1,2-epoxy-9-decene, 1,2-epoxy-5-hexene, 2-methyl-2-vinyloxirane, allyl glycidyl ether, 2,5-dihydrofuran, 2-cyclopenten-1-one ethylene ketal, 11-methoxyundec-1-ene, and 8-methoxyoct-1-ene; sulfur containing monomers including allyl disulfide; acid and ester substituted monomers including acrylic acid, vinylacetic acid, 4-pentenoic acid, 2,2-dimethyl-4-pentenoic acid, 6-heptenoic acid, trans-2,4-pentadienoic acid, 2,6-heptadienoic acid, methyl acrylate, ethyl acrylate, tert-butyl acrylate, n-butyl acrylate, methacrylic acid, methyl methacrylate, ethyl methacrylate, tert-butyl methacrylate, n-butyl methacrylate, hydroxypropyl acrylate, acetic acid oct-7-enyl ester, non-8-enoic acid methyl ester, acetic acid undec-10-enyl ester, dodec-11-enoic acid methyl ester, propionic acid undec-10-enyl ester, dodec-11-enoic acid ethyl ester, and nonylphenoxypolyetheroxy acrylate; siloxy containing monomers including trimethyloct-7-enyloxy silane, and trimethylundec-10-enyloxy silane, polar functionalized norbornene monomers including 5-norbornene-2-carbonitrile, 5-norbornene-2-carboxaldehyde, 5-norbornene-2-carboxylic acid, cis-5-norbornene-endo-2,3-dicarboxylic acid, 5-norbornene-2,2,-dimethanol, cis-5-norbornene-endo-2,3-dicarboxylic anhydride, 5-norbornene-2-endo-3-endo-dimethanol, 5-norbornene-2-endo-3-exo-dimethanol, 5-norbornene-2-methanol, 5-norbornene-2-ol, 5-norbornene-2-yl acetate, 1-[2-(5-norbornene-2-yl)ethyl]-3,5,7,9,11,13,15-heptacyclopentylpentacyclo[$9.5.1.1^{3,9}.1^{5,15}.1^{7.13}$]octasiloxane, 2-benzoyl-5-norbornene, 2-acetyl-5-norbornene, 7-syn methoxymethyl-5-norbomen-2-one, 5-norbomen-2-ol, and 5-norbornen-2-yloxy-trimethylsilane, and partially fluorinated monomers including nonafluoro-1-hexene, allyl-1,1,2,2,-tetrafluoroethyl ether, 2,2,3,3-tetrafluoronon-8-enoic acid ethyl ester, 1,1,2,2-tetrafluoro-2-(1,1,2,2-tetrafluoro-oct-7-enyloxy)-ethanesulfonyl fluoride, acrylic acid 2,2,3,3,4,4,5,5,6,6,7,7,8,8,8-pentadecafluoro-octyl ester, and 1,1,2,2-tetrafluoro-2-(1,1,2,2,3,3,4,4-octafluoro-dec-9-enyloxy)-ethanesulfonyl fluoride.

In an embodiment herein, the process described herein is used to produce an oligomer of any of the monomers listed above. Preferred oligomers include oligomers of any $C_2$ to $C_{20}$ olefins, preferably $C_2$ to $C_{12}$ alpha-olefins, most preferably oligomers comprising ethylene, propylene and or butene are prepared. A preferred feedstock for the oligomerization process is the alpha-olefin, ethylene. But other alpha-olefins, including but not limited to propylene and 1-butene, may also be used alone or combined with ethylene. Preferred alpha-olefins include any $C_2$ to $C_{40}$ alpha-olefin, preferably and $C_2$ to $C_{20}$ alpha-olefin, preferably any $C_2$ to $C_{12}$ alpha-olefin, preferably ethylene, propylene, and butene, most preferably ethylene.

Dienes may be used in the processes described herein, preferably alpha-omega-dienes are used alone or in combination with mono-alpha olefins.

In a preferred embodiment the process described herein may be used to produce homopolymers or copolymers. (For the purposes of this invention and the claims thereto a copolymer may comprise two, three, four or more different monomer units.) Preferred polymers produced herein include homopolymers or copolymers of any of the above monomers. In a preferred embodiment the polymer is a homopolymer of any $C_2$ to C12 alpha-olefin. Preferably the polymer is a homopolymer of ethylene or a homopolymer of propylene. In another embodiment the polymer is a copolymer comprising ethylene and one or more of any of the monomers listed above. In another embodiment the polymer is a copolymer comprising propylene and one or more of any of the monomers listed above. In another preferred embodiment the homopolymers or copolymers described, additionally comprise one or more diolefin comonomers, preferably one or more $C_4$ to $C_{40}$ diolefins.

In another preferred embodiment the polymer produced herein is a copolymer of ethylene and one or more $C_3$ to $C_{20}$ linear, branched or cyclic monomers, preferably one or more $C_3$ to C12 linear, branched or cyclic alpha-olefins. Preferably the polymer produced herein is a copolymer of ethylene and one or more of propylene, butene, pentene, hexene, heptene, octene, nonene, decene, dodecene, 4-methylpentene-1,3-methylpentene-1,3,5,5-trimethylhexene-1, cyclopentene, 4-methylcyclopentene, cyclohexene, and 4-methylcyclohexene.

In another preferred embodiment the polymer produced herein is a copolymer of propylene and one or more $C_2$ or $C_4$ to $C_{20}$ linear, branched or cyclic monomers, preferably one or more $C_2$ or $C_4$ to $C_{12}$ linear, branched or cyclic alpha-olefins. Preferably the polymer produced herein is a copolymer of propylene and one or more of ethylene, butene, pentene, hexene, heptene, octene, nonene, decene, dodecene, 4-methylpentene-1,3-methylpentene-1, and 3,5,5-trimethylhexene-1.

In a preferred embodiment, the polymer produced herein is a homopolymer of norbornene or a copolymer of norbornene and a substituted norbornene, including polar functionalized norbornenes.

In a preferred embodiment the polymers described above further comprise one or more dienes at up to 10 weight %, preferably at 0.00001 to 1.0 weight %, preferably 0.002 to 0.5 weight %, even more preferably 0.003 to 0.2 weight %, based upon the total weight of the composition. In some embodiments 500 ppm or less of diene is added to the polymerization, preferably 400 ppm or less, preferably or 300 ppm or less. In other embodiments at least 50 ppm of diene is added to the polymerization, or 100 ppm or more, or 150 ppm or more.

In a preferred embodiment the copolymers described herein comprise at least 50 mole % of a first monomer and up to 50 mole % of other monomers.

In another embodiment, the polymer comprises:
a first monomer present at from 40 to 95 mole %, preferably 50 to 90 mole %, preferably 60 to 80 mole %, and
a comonomer present at from 5 to 60 mole %, preferably 10 to 40 mole %, more preferably 20 to 40 mole %, and
a termonomer present at from 0 to 10 mole %, more preferably from 0.5 to 5 mole %, more preferably 1 to 3 mole %.

In a preferred embodiment the first monomer comprises one or more of any $C_3$ to C8 linear branched or cyclic alpha-olefins, including propylene, butene, (and all isomers thereof), pentene (and all isomers thereof), hexene (and all isomers thereof), heptene (and all isomers thereof), and octene (and all isomers thereof). Preferred monomers include propylene, 1-butene, 1-hexene, 1-octene, cyclopentene, cyclohexene, cyclooctene, hexadiene, cyclohexadiene and the like.

In a preferred embodiment the comonomer comprises one or more of any $C_2$ to $C_{40}$ linear, branched or cyclic alpha-olefins (provided ethylene, if present, is present at 5 mole % or less), including ethylene, propylene, butene, pentene, hexene, heptene, and octene, nonene, decene, undecene, dodecene, hexadecene, butadiene, hexadiene, heptadiene, pentadiene, octadiene, nonadiene, decadiene, dodecadiene, styrene, 3,5,5-trimethylhexene-1,3-methylpentene-1,4-methylpentene-1, cyclopentadiene, and cyclohexene.

In a preferred embodiment the termonomer comprises one or more of any $C_2$ to $C_{40}$ linear, branched or cyclic alpha-olefins, (provided ethylene, if present, is present at 5 mole % or less), including ethylene, propylene, butene, pentene, hexene, heptene, and octene, nonene, decene, undecene, dodecene, hexadecene, butadiene, hexadiene, heptadiene, pentadiene, octadiene, nonadiene, decadiene, dodecadiene, styrene, 3,5,5-trimethylhexene-1,3-methylpentene-1,4-methylpentene-1, cyclopentadiene, and cyclohexene.

Polymer Produced

The polymers produced by the process of the invention can be used in a wide variety of products and end-use applications. Preferred polymers produced herein may have an $M_n$ (number-average molecular weight) value from 300 to 1,000,000, or between from 700 to 300,000. For low weight molecular weight applications, such as those copolymers useful in lubricating and fuel oil compositions, an $M_n$ of 300 to 20,000 is contemplated, or less than or equal to 10,000. For higher molecular weight applications the polymers produced herein preferably have Mw's of 50,000 to 1,000,000, preferably 70,000 to 500,000. Additionally, preferred polymers and copolymers produced herein may have a molecular weight distribution (MWD) in the range of $\geq 1$, or $\geq 2$ or $\leq 10$, or $\leq 8$ or $\leq 4$.

The polymers produced are preferably homo- and co-polymers of ethylene and propylene and include linear low density polyethylene, elastomers, plastomers, high-density polyethylenes, medium density polyethylenes, low density polyethylenes, polypropylene and polypropylene copolymers. Polymers, typically ethylene based copolymers, have a density of from 0.86 g/cc to 0.97 g/cc; density being measured in accordance with ASTM-D-1238.

The polymers of this invention may be blended and/or coextruded with any other polymer. Non-limiting examples of other polymers include linear low density polyethylenes, elastomers, plastomers, high pressure low density polyethylene, high density polyethylenes, isotactic polypropylene, ethylene propylene copolymers and the like.

Polymers produced by the process of the invention and blends thereof are useful in such forming operations as film, sheet, and fiber extrusion and co-extrusion as well as blow molding, injection molding, roto-molding. Films include blown or cast films formed by coextrusion or by lamination useful as shrink film, cling film, stretch film, sealing film, oriented films, and the like.

EXAMPLES

Polymerization Using Ziegler-Natta Type Catalysts

Examples ICP1 to ICP5 were produced in a two-stage polymerization reaction by polymerizing propylene in a first stage to make homopolymer, and copolymerizing propylene and ethylene in the presence of the homopolymer in the second stage. The polymerization was carried out in a 0.5-liter autoclave reactor equipped with a stirrer, an external water/steam jacket for temperature control, a regulated supply of dry nitrogen, ethylene, propylene, and a septum inlet for introduction of other solvents, catalysts and scavenger solutions. The reactor was dried and degassed thoroughly prior to use. All the solvents and monomers were purified by passing through a 1-liter basic alumina column activated at 600° C., followed by a column of molecular sieves activated at 600° C. or Selexsorb CD column prior to transferring into the reactor. In the first stage of polymerization using Ziegler-Natta type catalyst, 2 ml of triethyl aluminum (TEAL) (1 mol % in hexane) and 2 ml of cyclohexylmethyl dimethoxysilane (CMMS) (0.1 mol % in hexane) solution were first added into the reactor. Then the catalyst slurry was cannulated into the reactor using nitrogen. In succession, fluorocarbon and propylene were added into the reactor. All of these were conducted at room temperature. The mixture was then stirred and heated to a desired temperature. The polymerization was conducted for about 60 minutes. Thereafter, the reactor was depressurized by venting the unreacted propylene and solvent to the atmosphere until the reactor pressure reach about 5 psig (34.5 kPa) to maintain an inert atmosphere in the reactor for the continuation of polymerization in the second stage.

In the second stage of polymerization, propylene and solvent including fluorocarbon were added into the mixture produced in the first stage. The mixture was then stirred and heated to a desired reaction temperature, followed by the addition of ethylene. The ethylene was fed on demand to maintain a relative constant reactor pressure during the polymerization reaction. The ethylene consumption was monitored during the reaction using a mass flow meter. The amount of ethylene addition was controlled by setting the ethylene feed pressure and was reported as a differential pressure in excess of the combined vapor pressure of monomers and solvents prior to ethylene addition. Thereafter, the reactor was cooled down and unreacted monomer and solvent were vented to the atmosphere. The resulting mixture, containing mostly solvent, polymer and unreacted monomers, was collected in a collection box and first air-dried in a hood to evaporate most of the solvent, and then dried in a vacuum oven at a temperature of about 90° C. for about 12 hours. The detailed polymerization conditions and some analytical data for Examples ICP 1 to ICP5 are listed in Table 1. THC catalyst was a Ziegler-Natta type catalyst comprised of $TiCl_4$ supported on $MgCl_2$ sold commercially by TOHO Titanium Company, Japan (Lot #, THC-C-133-54). The catalyst was suspended in oil with 5 wt. % of THC catalyst for easy processing.

TABLE 1

Polymerization conditions and polymer properties

| Run # | ICP1 | ICP2 | ICP3 | ICP4 | ICP5 |
|---|---|---|---|---|---|
| Polymerization in the first stage | | | | | |
| Reaction Temp(° C.) | 70 | 70 | 70 | 70 | 70 |
| Catalyst | THC | THC | THC | THC | THC |
| Catalyst amount (mg) | 12 | 5.15 | 6.5 | 6.15 | 6.4 |
| Propylene feed (ml) | 125 | 125 | 125 | 150 | 125 |
| Solvent | HFC236fa | HFC236fa | HFC236fa | HFC236fa | HFC245fa |
| Solvent amount (ml) | 125 | 125 | 125 | 125 | 125 |
| Reaction time (min) | 60 | 60 | 60 | 60 | 64 |

TABLE 1-continued

Polymerization conditions and polymer properties

| Run # | ICP1 | ICP2 | ICP3 | ICP4 | ICP5 |
|---|---|---|---|---|---|
| Polymerization in the second stage | | | | | |
| Reaction temperature (° C.) | 70 | 70 | 70 | 70 | 70 |
| Propylene (ml) | 100 | 100 | 100 | 50 | 100 |
| Ethylene (psid) | 100 | 100 | 150 | 175 | 100 |
| Solvent | HFC236fa | HFC236fa | HFC236fa | HFC236fa | HFC245fa |
| Solvent feed (ml) | 150 | 150 | 150 | 150 | 150 |
| Reaction time (min) | 60 | 60 | 60 | 60 | 60 |
| Yield (g) | 156 | 19.4 | 31.8 | 21.1 | 54.4 |
| Mn (kg/mol) | | | | | |
| Mw (kg/mol) | | | | | |
| Mz (kg/mol) | | | | | |
| First melting peak in 2nd melt and the first cooling peak | | | | | |
| Tc (° C.) | 102.2 | 104.8 | 106.2 | 107.7 | 93.9 |
| Tm (° C.) | 164.3 | 163.4 | 162.5 | 162.2 | 163.3 |
| Heat of fusion (J/g) | 18.3 | 29.5 | 29.2 | 31.0 | 9.1 |
| Tg (° C.) | | | | | |
| Second melting peak in 2nd melt and second cooling peak | | | | | |
| Tm (° C.) | 119.7 | 116.8 | 118.4 | 120.2 | 115.4 |
| Heat of fusion (J/g) | 19.2 | 12.5 | 23.9 | 29.7 | 13.4 |
| Ethylene (wt %) | | | | | |

HFC-236fa is 1,1,1,3,3,3-hexafluoropropane obtained from Du Pont under the tradename SUVA 236fa.

HFC 245fa is 1,1,1,3,3-pentafluoropropane obtained from Honeywell under the tradename ENOVATE 3000.

Polymerization Using Metallocene Type Catalysts

Examples ICP6 to ICP11 were produced in a two-stage polymerization reaction by polymerizing propylene in a first stage to make homopolymer, and copolymerizing propylene and ethylene in the presence of the homopolymer in the second stage using a supported metallocene catalyst.

The catalyst system included a metallocene catalyst on a fluorided ("F") silica support, and a non-coordinating anion ("NCA") activator, such as described in U.S. Pat. No. 6,143,686. The catalyst system was prepared as described in U.S. Pat. No. 6,143,686 by combining trisperfluorophenylboron in toluene (Albemarle Corporation, Baton Rouge, La.) with N,N-diethyl aniline and then mixing the combination with fluorided silica. Rac-dimethylsilanyl-bis (2-methyl-4-phenylindenyl)zirconium dimethyl was then added.

The fluorided silica is described in International Patent Publication No. WO 00/12565. Generally, to prepare the fluorided silica, $SiO_2$ supplied by Grace Davison, a subsidiary of W. R. Grace Co., Conn., as Sylopol® 952 ("952 silica gel") having a $N_2$ pore volume of about 1.63 cc/gm and a surface area of about 312 $m^2$/gm, was dry mixed with 0.5 to 3 grams of ammonium hexafluorosilicate supplied by Aldrich Chemical Company, Milwaukee, Wis. The amount of ammonium hexafluorosilicate added corresponded to 1.05 millimole F per gram of silica gel. The mixture was transferred to a furnace and a stream of $N_2$ was passed up through the grid to fluidize the silica bed. The furnace was heated according to the following schedule:

Raise the temperature from 25 to 150° C. over 5 hours;
Hold the temperature at 150° C. for 4 hours;

Raise the temperature from 150 to 500° C. over 2 hours;
Hold the temperature at 500° C. for 4 hours;
Turn heat off and allow to cool under $N_2$;
When cool, the fluorided silica was stored under $N_2$.

The catalyst system was suspended in oil slurry for ease of addition to the reactor. Drakeol™ mineral oil (Penreco, Dickinson, Tex.) was used.

The polymerizations were conducted in a 2-liter autoclave reactor equipped similarly to the 0.5-liter autoclave reactor used for Examples ICP 1 to 5. The general procedure described in Example ICP1 to ICP5 above was followed with following exceptions. (1) 2 ml of triethyl aluminum (TEAL) (1 mol. % in hexane) was used as a scavenger; (2) $H_2$ was added into the reactor in stage 1 before the introduction of propylene, (3) there was no reactor depressurization at the end of stage, the second stage of polymerization started with ethylene and diluent addition. Details of the experimental conditions and the properties of the resultant polymer blends are listed in Table 2 below.

TABLE 2

Polymerization conditions with a supported metallocene catalyst and polymer properties

| Run # | ICP6 | ICP7 | ICP8 | ICP9 | ICP10 | ICP11 |
|---|---|---|---|---|---|---|
| Polymerization in the first stage | | | | | | |
| Reaction temp. (° C.) | 50 | 50 | 50 | 50 | 50 | 50 |
| Catalyst amt (mg) | 402 | 400 | 400 | 400 | 400 | 400 |
| Propylene feed (ml) | 800 | 800 | 800 | 800 | 800 | 800 |
| H2 (mmol) | 25 | 25 | 25 | 25 | 25 | 25 |
| Reaction time (min) | 30 | 45 | 60 | 80 | 100 | 120 |
| Polymerization in the second stage | | | | | | |
| Reaction temp. (° C.) | 50 | 50 | 50 | 50 | 50 | 50 |
| Ethylene (psi) | 200 | 200 | 200 | 200 | 200 | 200 |
| HFC245fa (ml) | 600 | 600 | 600 | 600 | 600 | 600 |
| Reaction time (min) | 15 | 30 | 13 | 15 | 10 | 14 |
| Yield (g) | 175 | 263 | 212.1 | 211 | 223 | 299.3 |
| Tc (° C.) | 111.3 | 108.8 | 106.1 | 105.3 | 105.9 | |
| Tm (° C.) | 150.7 | 151.5 | 150.1 | 153.7 | 151.2 | |
| Heat of fusion (J/g) | 36.1 | 28.8 | 51.5 | 39.3 | 69.1 | |
| Tg (° C.) | | | | −44.5 | | |
| Ethylene content (wt %) | 9.82 | 21.37 | 25.54 | 30.42 | 5.29 | 13.11 |

Tests and Materials

Peak melting point (Tm) and peak crystallization temperature (Tc) are determined using the following procedure according to ASTM E 794-85. Differential scanning calorimetric (DSC) data is obtained using a TA Instruments model 2910 machine. Samples weighing approximately 7-10 mg are sealed in aluminum sample pans. The DSC data are recorded by first cooling the sample to −100° C. and then gradually heating it to 200° C. at a rate of 10° C./minute. The sample is kept at 200° C. for 5 minutes before a second cooling-heating cycle is applied. Both the first and second cycle thermal events are recorded. Areas under the melting curves are measured and used to determine the heat of fusion and the degree of crystallinity according to ASTM 3417-99. The percent crystallinity is calculated using the formula, [area under the curve (Joules/gram)/B (Joules/gram)]*100, where B is the heat of fusion for the homopolymer of the major monomer component. These values for B are to be obtained from the Polymer Handbook, Fourth Edition, published by John Wiley and Sons, New York 1999. A value of 189 J/g (B) is used as the heat of fusion for 100% crystalline polypropylene. For polymers displaying multiple cooling and melting peaks, all the peak crystallization temperatures and peaks melting temperatures were reported. The heat of fusion for each melting peak was calculated individually.

The glass transition temperature (Tg) is measured by ASTM E 1356 using a TA Instruments model 2910 machine.

Ethylene content for samples produced using fluorocarbon is determined using $^{13}C$ nuclear magnetic resonance (NMR). All the peaks in the NMR spectra are referenced by setting the mmmm methyl peak to 21.8 ppm. All secondary carbons are defined by the peak regions in Table A. Naming of the peaks was made in accordance with a method by Carman, et al. in *Rubber Chemistry and Technology*, 44 (1971), page 781, where e.g., $S_{\alpha\delta}$ denotes a peak area of the $\alpha\delta^+$ secondary carbon peak.

TABLE A

| ppm range | assignment |
|---|---|
| 45-48 | $S_{\alpha\alpha}$ |
| 36-39 | $S_{\alpha\delta} + S_{\alpha\gamma}$ |
| 34-36 | $S_{\alpha\beta}$ |
| 30.7 | $S_{\gamma\gamma}$ |
| 30.3 | $S_{\gamma\delta}$ |
| 29.9 | $S_{\delta\delta}$ |
| 27.5-27.7 | $S_{\beta\gamma}$ |
| 27.1-27.3 | $S_{\beta\delta}$ |
| 24.5-25 | $S_{\beta\beta}$ |

All tertiary carbons are defined by the peak regions in Table B (Note that the peak region of 30.7-31 ppm has overlapping peaks of secondary and tertiary carbons):

TABLE B

| ppm range | assignment |
|---|---|
| 33.6-34 | $T_{\gamma\gamma}$ |
| 33.4-33.6 | $T_{\gamma\delta}$ |
| 33.2 | $T_{\delta\delta}$ |
| 31-31.4 | $T_{\beta\gamma}$ |
| 30.7-31 | $(T_{\beta\delta} + S_{\gamma\gamma})$ |
| 28-29 | $T_{\beta\beta}$ |

The $T_{\beta\delta}$ and $S_{\gamma\gamma}$ peaks are overlapping. The area of $S_{\gamma\gamma}$ peak can be calculated as:

$$S_{\gamma\gamma} = (S_{\beta\delta} - S_{\gamma\delta})/2 \quad (A)$$

In Table A, the area of $S_{\gamma\gamma}$ peak was calculated by equation A instead of direct integration. Total area of secondary carbons (S) was calculated by the sum of all areas in Table A. Total area of tertiary carbons (T) was calculated by the sum of all areas in Table B subtracted by the area of $S_{\gamma\gamma}$ peak, as calculated by equation (A).

Total area of primary carbons (P) is the total area between 19 and 23 ppm.

Ethylene content was calculated by $$E \text{ wt \%} = (S - T/2 - P/2)/(S + T + P) \quad (B)$$

FTIR is used to obtain the ethylene content of samples produced using hydrocarbon solvents. The ethylene content of ethylene/propylene copolymers was determined using FTIR according to the following technique. A thin homogeneous film of polymer, pressed at a temperature of about 150° C., was mounted on a Perkin Elner Spectrum 2000 infrared spectrophotometer. A full spectrum of the sample from 600 cm$^{-1}$ to 4000 cm$^{-1}$ was recorded and the ethylene content in wt. % was calculated according to the following equation:

$$\text{ethylene content (wt. \%)} = 72.698 - 86.495X + 13.696X^2$$

where $X=AR/(AR+1)$. The area under propylene band at ~1165 cm$^{-1}$ and the area of ethylene band at ~732 cm$^{-1}$ in the spectrum were calculated. The baseline integration range for the methylene rocking band is nominally from 695 cm$^{-1}$ to the minimum between 745 and 775 cm$^{-1}$. For the polypropylene band the baseline and integration range is nominally from 1195 to 1126 cm$^{-1}$. AR is the ratio of the area for the peak at ~1165 cm$^{-1}$ to the area of the peak at ~732 cm$^{-1}$.

Molecular weight (Mw, Mn, and Mz) and molecular weight distribution (Mw/Mn) distribution of the polymers were determined using gel permeation chromatography (GPC) on a Water 150 C high temperature chromatographic unit equipped with a DRI detector and four linear mixed bed columns (Polymer Laboratories PLgel Mixed-B LS, 20-micron particle size). The oven temperature was at 160° C. with the autosampler hot zone at 160° C. and the warm zone at 145° C. About 0.2 wt. % of polymer sample was dissolved in 1,2,4-trichlorobenzene containing 200 ppm 2,6-di-t-butyl-4-methylphenol. The flow rate was 1.0 milliliter/minute and the injection size is 100 microliters.

All documents described herein are incorporated by reference herein, including any priority documents and/or testing procedures. As is apparent from the foregoing general description and the specific embodiments, while forms of the invention have been illustrated and described, various modifications can be made without departing from the spirit and scope of the invention. Accordingly, it is not intended that the invention be limited thereby. Likewise, the term "comprising" is considered synonymous with the term "including" for purposes of Australian law.

The invention claimed is:

1. A continuous process to prepare olefin impact copolymers having a melting point of at least 145° C. comprising producing a semi-crystalline olefin polymer in a first reactor and then transferring the reactor contents to a second reactor to produce a low crystallinity olefin polymer in the presence of the semi-crystalline polymer, wherein a fluorinated hydrocarbon is present in a polymerization medium of the first reactor, the second reactor or both reactors.

2. The process as claimed in claim 1, comprising contacting one or more olefins and a catalyst system in a first reactor optionally in the presence of a fluorinated hydrocarbon and thereafter transferring the reactor contents to the second reactor and introducing one or more additional olefin monomers, in the presence of a fluorinated hydrocarbon, and thereafter obtaining an impact copolymer.

3. The process of claim 1 wherein ethylene is polymerized in the first or second reactor.

4. The process of claim 1 wherein propylene is polymerized in the first or second reactor.

5. The process as claimed in claim 4 wherein the olefin in the first reactor is or includes propylene, and the additional olefin monomers in the second reactor comprises ethylene, propylene, or both.

6. The process as claimed in claim 4 comprising contacting propylene and a catalyst system in the first reactor in the presence of a fluorinated hydrocarbon and thereafter transferring the reactor contents to the second reactor and introducing ethylene and, optionally propylene, optionally in the presence of a fluorinated hydrocarbon, and thereafter obtaining an impact copolymer.

7. The process of claim 1, wherein the polymerization medium of either or both reactors also comprises a hydrocarbon solvent or diluent.

8. The process of claim 7 wherein the hydrocarbon solvent or diluent comprises one or more of propane, n-butane, isobutane, n-pentane, isopentane, cyclopentane, neopentane, n-hexane, isohexane, and cyclohexane.

9. The process of claim 1, wherein the fluorinated hydrocarbon is present in an amount of from 0.1 to 99 volume %, based upon the volume of the polymerization medium in the reactor.

10. The process of claim 9, wherein the fluorinated hydrocarbon is present in an amount of from 5 to 90 volume %, based upon the volume of the polymerization medium in the reactor.

11. The process of claim 1, wherein the fluorinated hydrocarbon is present in an amount of more than 5 weight %, based upon the combined weight of the fluorinated hydrocarbon and any hydrocarbon solvent present in the reactor.

12. The process of claim 1 wherein the fluorinated hydrocarbon comprises a compound represented by the formula: $C_xH_yF_z$ wherein x is an integer from 1 to 40, y is an integer greater than or equal to 0 and z is an integer and is at least one.

13. The process of claim 1, wherein the fluorinated hydrocarbon comprises a perfluorinated hydrocarbon.

14. The process of claim 1, wherein the fluorinated hydrocarbon is not a perfluorinated C4 to C10 alkane.

15. The process of claim 1, wherein the fluorinated hydrocarbon comprises a hydrofluorocarbon.

16. The process of claim 1 wherein the fluorinated hydrocarbon comprises one or more of fluoromethane; difluoromethane; trifluoromethane; fluoroethane; 1,1-difluoroethane; 1,2-difluoroethane; 1,1,1-trifluoroethane; 1,1,2-trifluoroethane; 1,1,1,2-tetrafluoroethane; 1,1,2,2-tetrafluoroethane; 1,1,1,2,2-pentafluoroethane; 1-fluoropropane; 2-fluoropropane; 1,1-difluoropropane; 1,2-difluoropropane; 1,3-difluoropropane; 2,2-difluoropropane; 1,1,1-trifluoropropane; 1,1,2-trifluoropropane; 1,1,3-trifluoropropane; 1,2,2-trifluoropropane; 1,2,3-trifluoropropane; 1,1,1,2-tetrafluoropropane; 1,1,1,3-tetrafluoropropane; 1,1,2,2-tetrafluoropropane; 1,1,2,3-tetrafluoropropane; 1,1,3,3-tetrafluoropropane; 1,2,2,3-tetrafluoropropane; 1,1,1,2,2-pentafluoropropane; 1,1,2,3-pentafluoropropane; 1,1,1,3,3-pentafluoropropane; 1,1,2,2,3-pentafluoropropane; 1,1,2,3,3-pentafluoropropane; 1,1,1,2,2,3-hexafluoropropane; 1,1,1,2,3,3-hexafluoropropane; 1,1,1,3,3,3-hexafluoropropane; 1,1,1,2,2,3,3-heptafluoropropane; 1,1,1,2,3,3,3-heptafluoropropane; 1-fluorobutane; 2-fluorobutane; 1,1-difluorobutane; 1,2-difluorobutane; 1,3-difluorobutane; 1,4-difluorobutane; 2,2-difluorobutane; 2,3-difluorobutane; 1,1,1-trifluorobutane; 1,1,2-trifluorobutane; 1,1,3-trifluorobutane; 1,1,4-trifluorobutane; 1,2,2-trifluorobutane; 1,2,3-trifluorobutane; 1,3,3-trifluorobutane; 2,2,3-trifluorobutane; 1,1,1,2-tetrafluorobutane; 1,1,1,3-tetrafluorobutane; 1,1,1,4-tetrafluorobutane; 1,1,2,2-tetrafluorobutane; 1,1,2,3-tetrafluorobutane; 1,1,2,4-tetrafluorobutane; 1,1,3,3-tetrafluorobutane; 1,1,3,4-tetrafluorobutane; 1,1,4,4-tetrafluorobutane; 1,2,2,3-tetrafluorobutane; 1,2,2,4-tetrafluorobutane; 1,2,3,3-tetrafluorobutane; 1,2,3,4-tetrafluorobutane; 2,2,3,3-tetrafluorobutane; 1,1,1,2,2-pentafluorobutane; 1,1,1,2,3-pentafluorobutane; 1,1,1,2,4-pentafluorobutane; 1,1,1,3,3-pentafluorobutane; 1,1,1,3,4-pentafluorobutane; 1,1,1,4,4-pentafluorobutane; 1,1,2,2,3-pentafluorobutane; 1,1,2,2,4-pentafluorobutane; 1,1,2,3,3-pentafluorobutane; 1,1,2,4,4- pentafluorobutane; 1,1,3,3,4-pentafluorobutane; 1,2,2,3,3-pentafluorobutane; 1,2,2,3,4-pentafluorobutane; 1,1,1,2,2,3-hexafluorobutane; 1,1,1,2,2,4-hexafluorobutane; 1,1,1,2,3,3-hexafluorobutane, 1,1,1,2,3,4-hexafluorobutane; 1,1,1,2,4,4-hexafluorobutane; 1,1,1,3,3,4-hexafluorobutane; 1,1,1,3,4,4-hexafluorobutane; 1,1,1,4,4,4-hexafluorobutane; 1,1,2,2,3,3-hexafluorobutane; 1,1,2,2,3,4-hexafluorobutane; 1,1,2,2,4,4-hexafluorobutane; 1,1,2,3,3,4-hexafluorobutane; 1,1,2,3,4,4-hexafluorobutane; 1,2,2,3,3,4-hexafluorobutane; 1,1,1,2,2,3,3-heptafluorobutane; 1,1,1,2,2,4,4-heptafluorobutane; 1,1,1,2,2,3,4-heptafluorobutane; 1,1,1,2,3,3,4-heptafluorobutane; 1,1,1,2,3,4,4-heptafluorobutane; 1,1,1,2,4,4,4-heptafluorobutane; 1,1,1,3,3,4,4-heptafluorobutane; 1,1,1,2,2,3,3,4-octafluorobutane; 1,1,1,2,2,3,4,4-octafluorobutane; 1,1,1,2,3,3,4,4-octafluorobutane; 1,1,1,2,2,4,4,4-octafluorobutane; 1,1,1,2,3,4,4,4-octafluorobutane; 1,1,1,2,2,3,3,4,4-nonafluorobutane; 1,1,1,2,2,3,4,4,4-nonafluorobutane; 1-fluoro-2-methylpropane; 1,1-difluoro-2-methylpropane; 1,3-difluoro-2-methylpropane; 1,1,1-trifluoro-2-methylpropane; 1,1,3-trifluoro-2-methylpropane; 1,3-difluoro-2-(fluoromethyl)propane; 1,1,1,3-tetrafluoro-2-methylpropane; 1,1,3,3-tetrafluoro-2-methylpropane; 1,1,3-trifluoro-2-(fluoromethyl)propane; 1,1,1,3,3-pentafluoro-2-methylpropane; 1,1,3,3-tetrafluoro-2-(fluoromethyl)propane; 1,1,1,3-tetrafluoro-2-(fluoromethyl)propane; fluorocyclobutane; 1,1-difluorocyclobutane; 1,2-difluorocyclobutane; 1,3-difluorocyclobutane; 1,1,2-trifluorocyclobutane; 1,1,3-trifluorocyclobutane; 1,2,3-trifluorocyclobutane; 1,1,2,2-tetrafluorocyclobutane; 1,1,3,3-tetrafluorocyclobutane; 1,1,2,2,3-pentafluorocyclobutane; 1,2,3,3-pentafluorocyclobutane; 1,1,2,2,3,3-hexafluorocyclobutane; 1,1,2,2,3,4-hexafluorocyclobutane; 1,1,2,3,3,4-hexafluorocyclobutane; and 1,1,2,2,3,3,4-heptafluorocyclobutane.

17. The process of claim 1 wherein the fluorinated hydrocarbon comprises one or more of difluoromethane, trifluoromethane, 1,1-difluoroethane, 1,1,1-trifluoroethane, fluoromethane, and 1,1,1,2-tetrafluoroethane.

18. The process of claim 1 wherein the fluorinated hydrocarbon comprises one or more of 1,1,1,3,3,3-hexafluoropropane, 1,1,1,2-tetrafluoroethane, 1,1,1,3,3-pentafluoropropane, 1,1,1,3,3-pentafluorobutane, octafluorocyclobutane, and 2,3-dihydrodecafluoropentane.

19. A continuous process to prepare olefin impact copolymers comprising producing a semi-crystalline olefin polymer in a first reactor and then transferring the reactor contents to a second reactor to produce a low crystallinity olefin polymer in the presence of the semi-crystalline polymer, wherein a fluorinated hydrocarbon is present in a polymerization medium of the first reactor, the second reactor or both reactors, wherein the first or second reactor is a gas phase reactor.

20. The process of claim 1 wherein the first or second reactor is a slurry phase reactor.

21. A continuous process to prepare olefin impact copolymers comprising producing a semi-crystalline olefin polymer in a first reactor and then transferring the reactor contents to a second reactor to produce a low crystallinity olefin polymer in the presence of the semi-crystalline polymer, wherein a fluorinated hydrocarbon is present in a polymerization medium of the first reactor, the second reactor or both reactors, wherein the first or second reactor is a solution phase reactor.

22. The process of claim 1 wherein the reactors operate in the same phase.

23. A continuous process to prepare olefin impact copolymers comprising producing a semi-crystalline olefin polymer in a first reactor and then transferring the reactor contents to a second reactor to produce a low crystallinity olefin polymer in the presence of the semi-crystalline polymer, wherein a fluorinated hydrocarbon is present in a polymerization medium of the first reactor, the second reactor or both reactors, wherein the reactors operate in different phases.

24. A continuous process to prepare impact copolymers having a melting point of at least 145° C. comprising producing a semi-crystalline polymer in a first reaction zone and then transferring the semi-crystalline polymer to a second reaction zone to produce a low crystallinity polymer in the presence of the semi-crystalline polymer, wherein a fluorinated hydrocarbon is present in a polymerization medium of the first reaction zone, the second reaction zone or both reaction zones.

25. The process of claim 24 wherein the fluorocarbon is present in the first reaction zone.

26. The process of claim 24 wherein the fluorocarbon is present in the second reaction zone.

27. The process as claimed in claim 24 comprising contacting one or more olefins and the catalyst system in a first reaction zone optionally in the presence of a fluorinated hydrocarbon and thereafter transferring the reaction zone contents to the second reaction zone and introducing one or more additional olefin monomers, in the presence of a fluorinated hydrocarbon, and thereafter obtaining an impact copolymer.

28. The process of claim 24 wherein ethylene is polymerized in the first or second reaction zone.

29. The process of claim 24 wherein propylene is polymerized in the first or second reaction zone.

30. The process as claimed in claim 29 to produce impact polypropylene copolymers, wherein the olefin in the first reaction zone is or includes propylene, and the additional olefin monomers in the second reaction zone comprises ethylene and, optionally propylene.

31. The process as claimed in claim 29 to produce impact polypropylene copolymers, comprising contacting propylene and a catalyst system in the first reaction zone in the presence of a fluorinated hydrocarbon and thereafter transferring the reaction zone contents to the second reaction zone and introducing ethylene and, optionally propylene, optionally in the presence of a fluorinated hydrocarbon, and thereafter obtaining the impact copolymer.

32. The process of claim 24, wherein the polymerization medium of either or both reaction zones also comprises a hydrocarbon solvent or diluent.

33. The process of claim 32 wherein the hydrocarbon solvent or diluent comprises one or more of propane, n-butane, isobutane, n-pentane, isopentane, neopentane, n-hexane, isohexane, and cyclohexane.

34. The process of claim 24, wherein when the fluorinated hydrocarbon is present in the polymerization medium of the first reaction zone, the second reaction zone or both reaction zones, the fluorinated hydrocarbon is present in an amount of from 0.1 to 99 volume %, based upon the volume of the polymerization medium in the reaction zone, where the fluorinated hydrocarbon is present.

35. The process of claim 34, where the fluorinated hydrocarbon is present in an amount of from 5 to 90 volume %, based upon the volume of the polymerization medium in the reaction zone, where the fluorinated hydrocarbon is present.

36. The process of claim 24, wherein the polymerization medium of either or both reaction zones also comprises a hydrocarbon solvent or diluent wherein the fluorinated hydrocarbon present in either or both reaction zones is present in an amount of more than 5 weight %, based upon the combined weight of the fluorinated hydrocarbon and any hydrocarbon solvent present in the reaction zone.

37. The process of claim 24 wherein the fluorinated hydrocarbon comprises a compound represented by the formula: $C_xH_yF_z$ wherein x is an integer from 1 to 40, y is an integer greater than or equal to 0 and z is an integer and is at least one.

38. The process of claim 37, wherein the fluorinated hydrocarbon comprises a perfluorinated hydrocarbon.

39. The process of claim 38, where the perfluorinated hydrocarbon is not a perfluorinated C4 to C10 alkane.

40. The process of claim 37, wherein the fluorinated hydrocarbon comprises a hydrofluorocarbon.

41. The process of claim 37 wherein the fluorinated hydrocarbon comprises one or more of fluoromethane; difluoromethane; trifluoromethane; fluoroethane; 1,1-difluoroethane; 1,2-difluoroethane; 1,1,1-trifluoroethane; 1,1,2-trifluoroethane; 1,1,1,2-tetrafluoroethane; 1,1,2,2-tetrafluoroethane; 1,1,1,2,2-pentafluoroethane; 1-fluoropropane; 2-fluoropropane; 1,1-difluoropropane; 1,2-difluoropropane; 1,3-difluoropropane; 2,2-difluoropropane; 1,1,1-trifluoropropane; 1,1,2-trifluoropropane; 1,1,3-trifluoropropane; 1,2,2-trifluoropropane; 1,2,3-trifluoropropane; 1,1,1,2-tetrafluoropropane; 1,1,1,3-tetrafluoropropane; 1,1,2,2-tetrafluoropropane; 1,1,2,3-tetrafluoropropane; 1,1,3,3-tetrafluoropropane; 1,2,2,3-tetrafluoropropane; 1,1,1,2,2-pentafluoropropane; 1,1,1,2,3-pentafluoropropane; 1,1,1,3,3-pentafluoropropane; 1,1,2,2,3-pentafluoropropane; 1,1,2,3,3-pentafluoropropane; 1,1,1,2,2,3-hexafluoropropane; 1,1,1,2,3,3-hexafluoropropane; 1,1,1,3,3,3-hexafluoropropane; 1,1,1,2,2,3,3-heptafluoropropane; 1,1,1,2,3,3,3-heptafluoropropane; 1-fluorobutane; 2-fluorobutane; 1,1-difluorobutane; 1,2-difluorobutane; 1,3-difluorobutane; 1,4-difluorobutane; 2,2-difluorobutane; 2,3-difluorobutane; 1,1,1-trifluorobutane; 1,1,2-trifluorobutane; 1,1,3-trifluorobutane; 1,1,4-trifluorobutane; 1,2,2-trifluorobutane; 1,2,3-trifluorobutane; 1,3,3-trifluorobutane; 2,2,3-trifluorobutane; 1,1,1,2-tetrafluorobutane; 1,1,1,3-tetrafluorobutane; 1,1,1,4-tetrafluorobutane; 1,1,2,2-tetrafluorobutane; 1,1,2,3-tetrafluorobutane; 1,1,2,4-tetrafluorobutane; 1,1,3,3-tetrafluorobutane; 1,1,3,4-tetrafluorobutane; 1,1,4,4-tetrafluorobutane; 1,2,2,3-tetrafluorobutane; 1,2,2,4-tetrafluorobutane; 1,2,3,3-tetrafluorobutane; 1,2,3,4-tetrafluorobutane; 2,2,3,3-tetrafluorobutane; 1,1,1,2,2-pentafluorobutane; 1,1,1,2,3-pentafluorobutane; 1,1,1,2,4-pentafluorobutane; 1,1,1,3,3-pentafluorobutane; 1,1,1,3,4-pentafluorobutane; 1,1,1,4,4-pentafluorobutane; 1,1,2,2,3-pentafluorobutane; 1,1,2,2,4-pentafluorobutane; 1,1,2,3,3-pentafluorobutane; 1,1,2,4,4-pentafluorobutane; 1,1,3,3,4-pentafluorobutane; 1,2,2,3,3-pentafluorobutane; 1,2,2,3,4-pentafluorobutane; 1,1,1,2,2,3-hexafluorobutane; 1,1,1,2,2,4-hexafluorobutane; 1,1,1,2,3,3-hexafluorobutane; 1,1,1,2,3,4-hexafluorobutane; 1,1,1,2,4,4-hexafluorobutane; 1,1,1,3,3,4-hexafluorobutane; 1,1,1,3,4,4-hexafluorobutane; 1,1,1,4,4,4-hexafluorobutane; 1,1,2,2,3,3-hexafluorobutane; 1,1,2,2,3,4-hexafluorobutane; 1,1,2,2,4,4-hexafluorobutane; 1,1,2,3,3,4-hexafluorobutane; 1,1,2,3,4,4-hexafluorobutane; 1,2,2,3,3,4-hexafluorobutane; 1,1,1,2,2,3,3-heptafluorobutane; 1,1,1,2,2,4,4-heptafluorobutane; 1,1,1,2,2,3,4-heptafluorobutane; 1,1,1,2,3,3,4-heptafluorobutane; 1,1,1,2,3,4,4-heptafluorobutane; 1,1,1,2,4,4,4-heptafluorobutane; 1,1,1,3,3,4,4-heptafluorobutane; 1,1,1,2,2,3,3,4-octafluorobutane; 1,1,1,2,2,3,4,4-octafluorobutane; 1,1,1,2,3,3,4,4-octafluorobutane; 1,1,1,2,2,4,4,4-octafluorobutane; 1,1,1,2,3,4,4,4-octafluorobutane; 1,1,1,2,2,3,3,4-nonafluorobutane; 1,1,1,2,2,3,4,4,4-nonafluorobutane; 1-fluoro-2-methylpropane; 1,1-difluoro-2-methylpropane; 1,3-difluoro-2-methylpropane; 1,1,1-trifluoro-2-methylpropane; 1,1,3-trifluoro-2-methylpropane; 1,3-difluoro-2-(fluoromethyl)propane; 1,1,1,3-tetrafluoro-2-methylpropane; 1,1,3,3-tetrafluoro-2-methylpropane; 1,1,3-trifluoro-2-(fluoromethyl)propane; 1,1,1,3,3-pentafluoro-2-methylpropane; 1,1,3,3-tetrafluoro-2-(fluoromethyl)propane; 1,1,1,3-tetrafluoro-2-(fluoromethyl)propane; fluorocyclobutane; 1,1-difluorocyclobutane; 1,2-difluorocyclobutane; 1,3-difluorocyclobutane; 1,1,2-trifluorocyclobutane; 1,1,3-trifluorocyclobutane; 1,2,3-trifluorocyclobutane; 1,1,2,2-tetrafluorocyclobutane; 1,1,3,3-tetrafluorocyclobutane; 1,1,2,2,3-pentafluorocyclobutane; 1,2,3,3-pentafluorocyclobutane; 1,1,2,2,3,3-hexafluorocyclobutane; 1,1,2,2,3,4-hexafluorocyclobutane; 1,1,2,3,3,4-hexafluorocyclobutane; and 1,1,2,2,3,3,4-heptafluorocyclobutane.

42. The process of claim 41 wherein the fluorinated hydrocarbon comprises one or more of 1,1,1,3,3,3-hexafluoropropane, 1,1,1,2-tetrafluoroethane, 1,1,1,3,3-pentafluoropropane, 1,1,1,3,3-pentafluorobutane, octafluorocyclobutane, and 2,3-dihydrodecafluoropentane.

43. The process of claim 24 wherein the first reaction zone and the second reaction zone are present in the same reactor.

44. The process of claim 40 wherein the fluorinated hydrocarbon comprises one or more of difluoromethane, trifluoromethane, 1,1-difluoroethane, 1,1,1-trifluoroethane, fluoromethane, and 1,1,1,2-tetrafluoroethane.

* * * * *

UNITED STATES PATENT AND TRADEMARK OFFICE
CERTIFICATE OF CORRECTION

PATENT NO. : 7,662,892 B2  Page 1 of 1
APPLICATION NO. : 11/628183
DATED : February 16, 2010
INVENTOR(S) : Jiang et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 580 days.

Signed and Sealed this

Thirtieth Day of November, 2010

David J. Kappos
*Director of the United States Patent and Trademark Office*